(12) United States Patent
Ikeuchi

(10) Patent No.: US 8,202,234 B2
(45) Date of Patent: Jun. 19, 2012

(54) CONTROL DEVICE FOR WALKING ASSISTANCE DEVICE

(75) Inventor: Yasushi Ikeuchi, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 763 days.

(21) Appl. No.: 12/373,147

(22) PCT Filed: Apr. 11, 2007

(86) PCT No.: PCT/JP2007/057999
§ 371 (c)(1),
(2), (4) Date: Jan. 9, 2009

(87) PCT Pub. No.: WO2008/007486
PCT Pub. Date: Jan. 17, 2008

(65) Prior Publication Data
US 2010/0010639 A1    Jan. 14, 2010

(30) Foreign Application Priority Data

Jul. 12, 2006    (JP) ................. 2006-191382

(51) Int. Cl.
*A61H 1/00*    (2006.01)
*A61H 1/02*    (2006.01)
*A61H 5/00*    (2006.01)
*A61F 5/00*    (2006.01)

(52) U.S. Cl. ............ 601/5; 601/23; 601/35; 602/16; 602/19; 602/23

(58) Field of Classification Search .......... 601/5, 33–35, 601/23; 602/16, 23–25; 703/11; 700/245–264; 482/8, 51, 66, 900–901; 600/595; 623/24, 623/27, 40, 44; 607/49
See application file for complete search history.

(56) References Cited

U.S. PATENT DOCUMENTS

| 406,328 A | 7/1889 | Yagn |
| 2004/0107780 A1* | 6/2004 | Kawai et al. ............... 73/862.08 |
| 2004/0158175 A1* | 8/2004 | Ikeuchi et al. .................... 601/5 |
| 2006/0276728 A1* | 12/2006 | Ashihara et al. .................. 601/5 |

FOREIGN PATENT DOCUMENTS

| EP | 1726281 | 11/2006 |
| JP | 05-328186 | 12/1993 |
| JP | 06-079657 | 3/1994 |

(Continued)

*Primary Examiner* — Patricia Bianco
*Assistant Examiner* — Kari Petrik
(74) *Attorney, Agent, or Firm* — Rankin, Hill & Clark LLP

(57) ABSTRACT

A control device for a walking assistance device includes a seating section on which a user is seated, a pair of left and right foot sole installation sections fitted to the foot soles of the legs of the user, a pair of left and right leg links which connect the seating section to the foot sole installation sections, actuators which drive joints of the leg links, and an acting force detection means which detects force acting on the user from the seating section. The control device controls a driving force of at least one of the actuators according to the detected value of the acting force so that the force acting on the user is maintained at a least at a predetermined lower limit of upward force. Thus, desired user motions, such as jumping, can be performed while appropriate force acts on the user from the seating section.

7 Claims, 16 Drawing Sheets

FOREIGN PATENT DOCUMENTS

| | | |
|---|---|---|
| JP | 07-112035 | 5/1995 |
| JP | 2002-017795 | 1/2002 |
| JP | 2003-220102 | 8/2003 |
| JP | 2006-061460 | 3/2006 |
| WO | 20051079725 | 9/2005 |

* cited by examiner

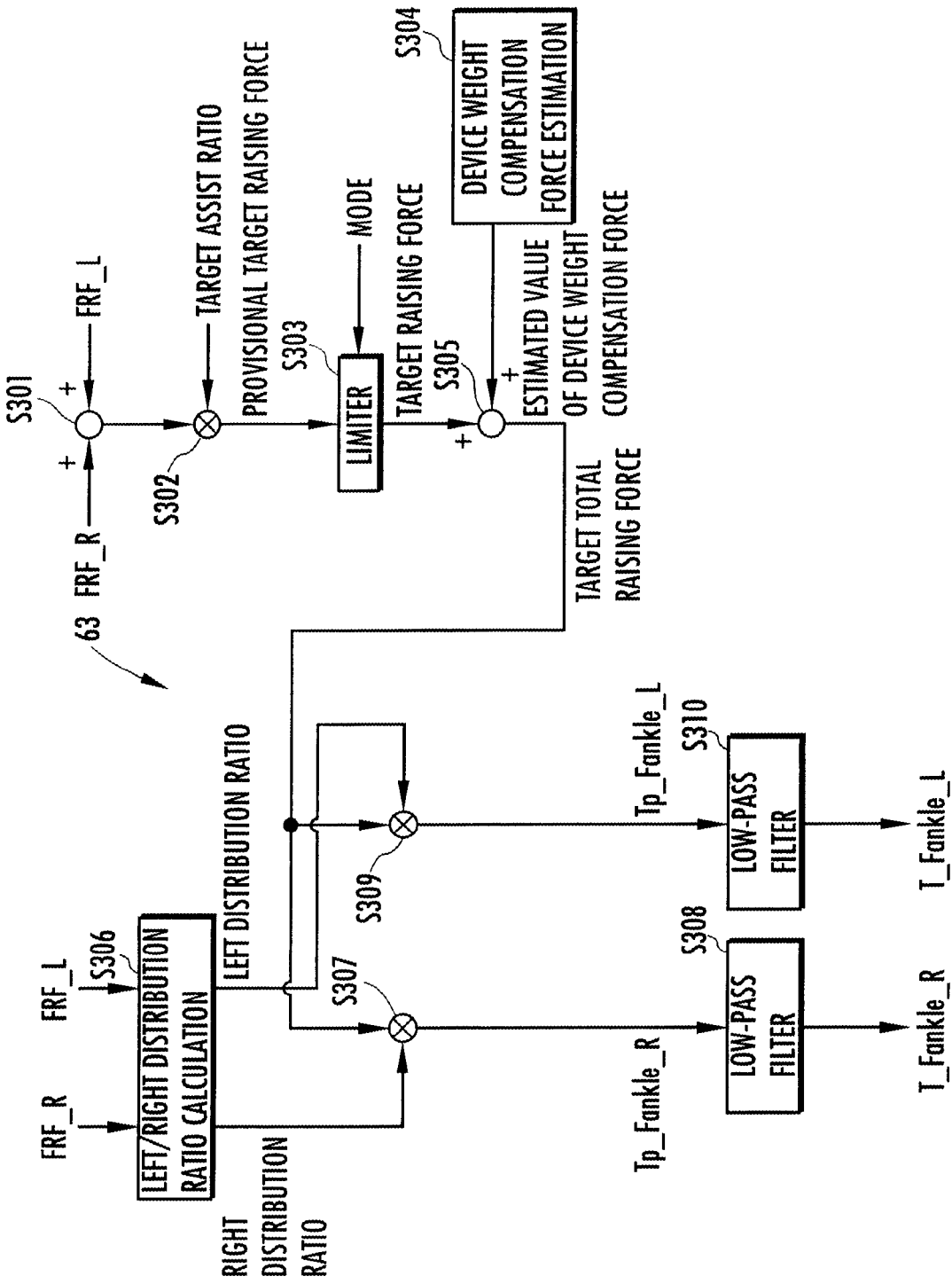

CONTROL DEVICE FOR WALKING ASSISTANCE DEVICE

TECHNICAL FIELD

The present invention relates to a control device for a walking assistance device for assisting a user (person) in motion such as walking.

BACKGROUND ART

Conventionally, as this type of device, there is known one disclosed in, for example, Paragraphs 0023 to 0030 and shown in FIG. 8 to FIG. 12 of Japanese Patent Application Laid-Open No. Hei 5(1993)-328186 (hereinafter, referred to as Patent Document 1). The walking assisting device shown in FIG. 8 to FIG. 12 of Patent Document 1 has a seat to which a walker's waist is fixed, and the walking assisting device is supported on a floor by four leg links extending from the seat. The leg links are not attached to the walker's legs so as to be capable of moving independently of the walker's legs.

Additionally, the walking assisting device has a sensor (a pressure sensor or 6-axial force sensor) for detecting force acting between the seat and the walker to drive joints of the leg links of the walking assisting device according to a comparison between the acting force detected by the sensor and a target value of the acting force. This assists the walker in walking.

The walking assisting device disclosed in Patent Document 1 is capable of supporting the walker's weight while the walker is walking. The walking assisting device, however, easily causes a mismatch between the motion of the leg links and the motion of the walker's legs that the walker desires since the leg links of the walking assisting device move independently of the motion of the walker's legs. Therefore, the walking assisting device is susceptible to occurrence of disabling the walker to make a walking motion in a manner of moving the legs that the walker desires.

Moreover, it is very difficult for the walker to match the timing of leaving the floor or landing of the walker's leg with the timing of leaving the floor or landing of the walking assisting device when the walker is to jump since the leg link of the walking assisting device moves independently of the motion of the walker's leg. Accordingly, it is practically impossible for the walker wearing the walking assisting device to jump.

Moreover, the walker's waist secured to the seat causes the walker to have an uncomfortable constrained feeling. If the walker's waist is not secured to the seat to remove the constrained feeling, the walker's waist is easily detached from the seat when the walker is to jump or the like, and thereafter the walking assisting device is not capable of assisting the walker's motion unless the walker reseats himself or herself.

DISCLOSURE OF THE INVENTION

Problem to be Solved by the Invention

The present invention has been made in view of the above background, and therefore it is an object of the present invention to provide a control device for a walking assistance device allowing a user to easily perform desired movements including a jumping motion while applying force for supporting the user's weight appropriately to the user from a seating section.

Means for Solving the Problem

To achieve the above object, according to an aspect of the present invention, there is provided a control device for a walking assistance device, comprising: a seating section which receives a part of the weight of a user who is seated on the seating section; a pair of left and right foot sole installation sections which are fitted to the foot soles of the legs of the user and land on the ground when the legs of the user are standing; a pair of left and right leg links each having a plurality of joints and connecting the seating section and the foot sole installation sections, respectively; an actuator for the right leg link and an actuator for the left leg link each of which drives at least one joint of each leg link; an acting force detection means which detects vertical force acting on the user from the seating section; and an actuator control means which controls a driving force of at least one of the actuator for the right leg link and the actuator for the left leg link according to at least the detected acting force so that the acting force is maintained at a level of a predetermined lower limit or greater of upward force (the first invention).

According to the first invention, each foot sole installation section connected through each leg link to the seating section is fitted to the foot sole of each leg of the user. Moreover, the driving force of at least one of the actuator for the right leg link and the actuator for the left leg link is controlled so that the force acting on the user from the seating section is maintained at a level of the predetermined lower limit or greater of the upward force. This allows the walking assistance device to perform movements together with the user while preventing the seating section from being away from the user without securing the seating section to the user, independently of the motion pattern that the user is to perform, including a case where the user is to jump.

Therefore, according to the first invention, the controller enables the user to easily perform a desired motion including a jumping motion while appropriately applying a force for supporting the user's weight from the seating section to the user.

In the first invention, preferably, the control device further comprises a target acting force setting means which limits a target acting force that is a target value of the acting force to the value equal to or greater than the lower limit and sets the target acting force to the value, and the actuator control means performs a feedback control for the driving force of at least one of the actuator for the right leg link and the actuator for the left leg link according to a difference between the target acting force and the detected acting force, so that the detected acting force is approximated to the target acting force (the second invention).

According to the second invention, the feedback control is performed for the driving force of at least one of the actuator for the right leg link and the actuator for the left leg link according to the difference between the target acting force limited and set to the value of the lower limit or greater and the detected acting force, and therefore it is possible to appropriately control the force acting on the user from the seating section to the target acting force of the lower limit or greater.

In the second invention, the target acting force may be set in many different modes. For example, the control device comprises a treading force measuring means which measures a treading force of each leg of the user on the basis of an output of a first force sensor provided in each of the foot sole installation sections, and the target acting force setting means sets the target acting force according to a total sum of the measured treading forces of the legs of the user while limiting the target acting force to the lower limit or greater (the third invention).

According to the third invention, the target acting force is set according to the total sum of the measured treading forces of the legs of the user, and therefore it is possible to set the target acting force adapted to the loads on the legs of the user.

The first force sensor may be attached to each foot sole installation section so as to be located between the foot sole of the leg and the floor, for example, when each leg of the user is standing. Although the first force sensor on each foot sole installation section may be composed of one force sensor in this instance, alternatively the first force sensor may be composed of a plurality of force sensors.

In the third invention, more specifically, for example, the target acting force setting means sets the target acting force to the lower limit at least in the case where the total sum of the treading forces is a predetermined value or smaller and sets the target acting force to a value greater than the lower limit in the case where the total sum of the treading forces is greater than the predetermined value (the fourth invention).

According to the fourth invention, in the case where the total sum of the treading forces is equal to or less than the predetermined value, for example, in a state immediately before the feet of the user leave the floor together with the foot sole installation sections when the user is to jump or in a state where the user exists in the air together with the walking assistance device after the feet leave the floor, it is possible to prevent the seating section from being away from the user by setting the target acting force to the lower limit. Moreover, in the case where the total sum of the treading forces is greater than the predetermined value, for example, in a state where the foot sole installation section fitted to one of the foot soles of the user is always landing, it is possible to apply an enough acting force to reduce the load on the user's leg from the seating section to the user.

Although the target acting force may be set to, for example, a constant value greater than the lower limit in the case where the total sum of the treading forces is greater than the predetermined value in the fourth invention, the target acting force may be increased along with an increase in the total sum of the treading forces. If the target acting force is set to the constant value in the case where the total sum of the treading forces is greater than the predetermined value, preferably the constant value is modifiable. Moreover, if the target acting force is increased along with the increase in the total sum of the treading forces in the case where the total sum of the treading forces is greater than the predetermined value, preferably the rate of increase in the target acting force to the increase in the total sum of the treading forces is modifiable. In this instance, it is also possible to set the upper limit of the target acting force and then to increase the target acting force along with the increase in the total sum of the treading forces within the range equal to or less than the upper limit.

In the third or fourth invention, preferably the target acting force setting means is capable of selectively changing how to set the target acting force to the total sum of the treading forces (the fifth invention).

According to the fifth invention, it is possible to determine the target acting force in a suitable form for a motion pattern that the user is to perform by using the walking assistance device.

Moreover, in the third to fifth inventions, preferably, the actuator control means controls the driving forces of the actuators according to first control inputs of the actuators, which have been determined so that a ratio between a share of the right leg link and a share of the left leg link of the force actually acting on the user from the seating section agrees with a target ratio determined according to a ratio between the treading force of the right leg and the treading force of the left leg of the user measured by the treading force measuring means, and a second control input, which is a feedback control input determined according to a difference between the target acting force and the detected acting force for at least one of the actuators (the sixth invention).

According to the sixth invention, the first control inputs of the actuators are determined so that a ratio between a share of the right leg link and a share of the left leg link of the force actually acting on the user from the seating section agrees with the target ratio determined according to the ratio between the treading force of the right leg and the treading force of the left leg of the user measured by the treading force measuring means. In this instance, the treading force ratio between the legs of the user reflects the user's intension of how the user is to support his/her own weight and the inertial force with the legs on the floor. Therefore, the first control inputs are determined as described above, and thus it is possible to determine the first control inputs of the actuators so that the leg links share the force actually acting on the user from the seating section at a rate suitable for the motion states of the legs desired by the user. Thereafter, the driving forces of the actuators are controlled according to the first control inputs and the second control input, which is a feedback control input determined according to the difference between the target acting force and the detected acting force, thereby enabling the walking assistance device to apply the target acting force to the user from the seating section while smoothly performing the motions of the leg links of the walking assistance device in patterns desired by the user.

In the case where the feedback control according to the difference between the target acting force and the detected acting force is intended only for one of the actuator for the right leg link and the actuator for the left leg link, the driving force of the intended actuator may be controlled, for example, by the control input obtained by correcting the first control input corresponding to the intended actuator by the second control input. Furthermore, for the other actuator, the driving force of the other actuator may be controlled by directly using the first control input corresponding to the actuator. Moreover, the target ratio may be determined to be, for example, the same ratio as a ratio between the right leg treading force and the left leg treading force of the user.

Moreover, in the third to sixth inventions, in the case where the measured treading force is different between the left and right legs of the user, the actuator which performs the feedback control according to the difference between the target acting force and the detected acting force includes at least the actuator for the leg link corresponding to the leg of the user whose measured treading force is greater than the other out of the actuator for the right leg link and the actuator for the left leg link (the seventh invention).

According to the seventh invention, the feedback control according to the difference between the target acting force and the detected acting force, in other words, the control of the driving force of the actuator for converging the difference to zero is performed by the actuator for the leg link whose treading force is greater than the other or mainly by the actuator. This enables the feedback control to be performed stably. It then becomes possible to cause the target acting force to act on the user from the seating section.

If the measured treading forces of the left and right legs of the user are the same as each other, the feedback control according to the difference between the target acting force and the detected acting force may be performed for either of the actuator for the right leg link and the actuator for the left leg link.

Moreover, if the seventh invention is combined with the sixth invention, the second control input is used at least for the actuator for the leg link whose treading force is greater than the other.

In more specific forms of the third to fifth inventions, for example, the control device comprises: a device weight compensation force estimating means which estimates the total sum of supporting forces acting on the leg links from the floor side as a device weight compensation force against a vertical inertial force actually generated in the walking assistance device by a motion of the walking assistance device and a gravity acting on the walking assistance device; a target total raising force determining means which determines the total sum of the target acting force and the estimated device weight compensation force as a target total raising force; and a distribution means which distributes the target total raising force according to a ratio between the measured treading force of the left leg and the measured treading force of the right leg of the user to determine target shares, which are target values of the shares of the leg links in the target total raising force, and the actuator control means controls the driving forces of the actuators according to the first control input of the actuator for the right leg link determined so that the supporting force actually acting on the right leg link from the floor side agrees with the target share corresponding to the right leg link, the first control input of the actuator for the left leg link determined so that the supporting force actually acting on the left leg link from the floor side agrees with the target share corresponding to the left leg link, and the second control input which is the feedback control input determined according to a difference between the target acting force and the detected acting force for at least one of the actuators (the eighth invention).

According to the eighth invention, the first control inputs of the actuators are each determined so that the supporting force actually acting on the corresponding leg link from the floor side agrees with the target share of the leg link. Moreover, the target shares are determined by distributing the target total raising force according to the ratio between the treading forces of the left and right legs of the user. For example, the target shares of the leg links are determined so that the ratio between the target share of the right leg link and the target share of the left leg link agrees with the ratio between the measured treading force of the user's right leg and the measured treading force of the user's left leg and the total sum of the target shares of the leg links agrees with the target total raising force. In this instance, the target total raising force is the total sum of the target acting force and the device weight compensation force.

Therefore, in the eighth invention, it is possible to determine the first control inputs of the actuators so that the target total raising force, which is the total sum of the target acting force and the estimated device weight compensation force, is shared by the leg links at a rate adapted to the motion states of the legs desired by the user. In other words, it is possible to determine the first control inputs enabling the actuators to operate so that the target acting force acts on the user from the seating section while causing the walking assistance device to bear the total sum of the supporting forces acting on the leg links from the floor side against a vertical inertial force generated in the walking assistance device along with the user's motions and a gravity acting on the walking assistance device. Moreover, it is possible to smoothly perform the operations of the leg links of the walking assistance device by controlling the driving forces of the actuators according to the first control inputs and the second control input, which is the feedback control input determined according to the difference between the target acting force and the detected acting force, and possible to allow the target acting force to act on the user from the seating section while compensating the effects of the vertical inertial force and the gravity caused by the weight of the walking assistance device.

Additionally, in the eighth invention, the device weight compensation force of the target total raising force is the total sum of the supporting forces acting on the leg links from the floor side against the vertical inertial force and the gravity caused by the weight of the walking assistance device. Therefore, in the event, the first control inputs are determined so that the target raising force is shared by the leg links at the ratio based on the ratio between the left and right treading forces of the user (at the same ratio as the target share ratio between the left and right leg links).

Moreover, in the case where only one of the actuators for the right leg link and the actuator for the left leg link is intended for the feedback control based on the difference between the target acting force and the detected acting force in the eighth invention, for example, the driving force of the intended actuator may be controlled according to a control input obtained by correcting the first control input corresponding to the intended actuator by the second control input. For the other actuator, the driving force of the other actuator may be controlled by directly using the first control input corresponding to the actuator.

It is possible to estimate the device weight compensation force by using the output of the joint displacement sensor for detecting the displacement of the joints of the leg links or the output of an acceleration sensor attached to the seating section.

In a further specific mode of the eighth invention, the control device comprises a force-to-be-controlled measuring means which measures the supporting forces actually acting on the leg links from the floor side as forces to be controlled on the basis of an output from second force sensors provided in the leg links. Further, the actuator control means includes a means which determines a right feedforward control input for the actuator for the right leg link according to at least the target share of the right leg link, a means which determines a right first feedback control input for the actuator for the right leg link according to a difference between the target share of the right leg link and the detected force to be controlled of the right leg link, a means which determines a left feedforward control input for the actuator for the left leg link according to at least the target share of the left leg link, a means which determines a left first feedback control input for the actuator for the left leg link according to a difference between the target share of the left leg link and the detected force to be controlled of the left leg link, and a means which determines a second feedback control input for one of the actuators according to a difference between the target acting force and the detected acting force. Moreover, the actuator control means controls the driving force of the actuator for the right leg link according to a control input, which is obtained by correcting the first control input by the second control input, with the right feedforward control input and the second feedback control input as the first control input of the actuator for the right leg link and the second control input, respectively, and controls the driving force of the actuator for the left leg link according to the first control input with a control input, which is obtained by correcting the left feedforward control input by the left first feedback control input, as the first control input of the actuator for the left leg link, in the case where the measured treading force of the right leg of the user is greater than the treading force of the left leg or in the case where the measured force to be controlled of the right leg link is greater than the force to be controlled of the left leg link. Moreover, the actuator control means controls the driving force of the actuator for the left leg link according to a control input, which is obtained by correcting the first control input by the second control input, with the left feedforward control input and the second feedback control input as the first control input of the actuator for the left leg link and the second control input, respectively, and controls the driving force of the actuator for the right leg link according to the first control input with a control input, which is obtained by correcting the right feedforward control input by the right first feedback control input, as the first control input of the actuator for the right leg link, in the case where the measured treading force of the left leg of the user is greater than the treading force of the right leg or in the case where the measured force to be controlled of the left leg link is greater than the force to be controlled of the right leg link (the ninth invention).

According to the ninth invention, the actuator control means controls the driving force of the actuator for the right leg link according to the control input, which is obtained by correcting the first control input by the second control input, with the right feedforward control input and the second feedback control input as the first control input of the actuator for the right leg link and the second control input, respectively, in the case where the measured treading force of the right leg of the user is greater than the treading force of the left leg or in the case where the measured force to be controlled of the right leg link is greater than the force to be controlled of the left leg link. This allows the force acting on the user from the seating section to be stably feedback-controlled to the target acting force while the right leg link, which is the leg link whose measured treading force or force to be controlled is greater than the other takes the target share corresponding to the leg link. Further, for the left leg link, the actuator control means controls the driving force of the actuator for the left leg link according to the first control input with a control input, which is obtained by correcting the left feedforward control input by the left first feedback control input, as the first control input of the actuator for the left leg link. This allows the force to be controlled of the left leg link to be reliably feedback-controlled to the target share of the left leg link.

Similarly, the actuator control means controls the driving force of the actuator for the left leg link according to the control input, which is obtained by correcting the first control input by the second control input, with the left feedforward control input and the second feedback control input as the first control input of the actuator for the left leg link and the second control input, respectively, in the case where the measured treading force of the left leg of the user is greater than the treading force of the right leg or in the case where the measured force to be controlled of the left leg link is greater than the force to be controlled of the right leg link. This allows the force acting on the user from the seating section to be stably feedback-controlled to the target acting force while the left leg link, which is the leg link whose measured treading force or force to be controlled is greater than the other takes the target share corresponding to the leg link. Further, for the right leg link, the actuator control means controls the driving force of the actuator for the right leg link according to the first control input with the control input, which is obtained by correcting the right feedforward control input by the right first feedback control input, as the first control input of the actuator for the right leg link. This allows the force to be controlled of the right leg link to be reliably feedback-controlled to the target share of the right leg link.

Further, in the ninth invention, the feedback control according to the difference between the target acting force and the detected acting force and the feedback control according to the difference between the target share and the measured force to be controlled are performed for the actuators for the leg links different from each other, which thereby prevents an interference between the feedback controls.

In the case where the measured treading forces of the left and right legs of the user are the same as each other or in the case where the measured forces to be controlled of the left and right leg links are the same as each other, the feedback control according to the difference between the target acting force and the detected acting force (the control using the second feedback control input) may be performed for one of the actuator for the right leg link and the actuator for the left leg link. Then, the feedback control according to the difference between the target share and the measured force to be controlled (the control using the right or left first feedback control input) may be performed for the actuator for the other leg link.

Moreover, the second force sensor in the ninth invention may be interposed near the foot sole installation section of each leg link, for example.

Moreover, the feedforward control input in the ninth invention may be determined at least according to the target share of each leg link. In this instance, it is also possible to determine the feedforward control input corresponding to the leg link in consideration of the detected value of the displacement of the joint of the leg link or the measured value of the force to be controlled of the leg link.

Additionally, in the first to ninth inventions, the leg link includes, for example, a thigh frame connected to the raising force transmission section through a first joint, a crus frame connected to the thigh frame through a second joint, and a third joint connecting the foot sole installation section to the crus frame. In this structure of the leg link, the first joint, the second joint, and the third joint correspond to a hip joint, a knee joint, and an ankle joint of the user, respectively. In this case, the actuators are preferably those for driving the second joint.

Moreover, the foot sole installation section preferably has a member including a flat plate-like portion interposed between the foot sole of the user and the floor surface and a highly-rigid portion which connects the flat plate-like portion to the leg link, for example, when each leg of the user is standing. For example, preferably each foot sole installation section includes a highly-rigid annular member (for example, a stirrup-shaped member) into which the user's foot sole to wear the foot sole installation section is inserted from its toe side and is connected to the leg link through the annular member. The provision of these members in the foot sole installation section enables the gravity acting on the walking assistance device and the inertial force generated in the walking assistance device to be act on the floor substantially without acting on the user. One of the two side walls of the annular member may be removed.

BEST MODE FOR CARRYING OUT THE INVENTION

A first embodiment of the present invention will be described below with reference to the accompanying drawings.

First, a mechanical structure of the walking assistance device according to this embodiment will be described with reference to FIG. 1 to FIG. 3. FIG. 1 is a side view of the walking assistance device 1, FIG. 2 is a view on arrow taken along line II of FIG. 1, and FIG. 3 is a sectional view taken along line III-III of FIG. 1. The walking assistance device 1 in FIG. 1 to FIG. 3 is shown in a state where the walking assistance device 1 is attached to a user A (indicated by a virtual line). In this instance, the shown user A is standing substantially upright. In FIG. 2, however, the user A is taking a posture of opening his/her legs horizontally for easy understanding of the structure of the walking assistance device 1.

Referring to FIG. 1 and FIG. 2, the walking assistance device 1 is a weight relief assist device which supports a part of the weight of the user A (which reduces the weight supported by the user with his/her own legs [standing legs] to the level lower than his/her weight). The walking assistance device 1 has a seating section 2 on which the user A is seated, a pair of left and right foot sole installation sections 15L and 15R connected to the seating section 2 through a pair of left and right leg links 3L and 3R, respectively. The leg links 3L and 3R are the same in structure, and the foot sole installation sections 15L and 15R are the same in structure. In FIG. 1, the leg links 3L and 3R are put side by side in the left/right direction of the user A (in a direction perpendicular to the paper surface of FIG. 1) in the same posture and overlap on the drawing in this state (the left leg link 3L is located on the near side of the figure). Much the same is true on the foot sole installation sections 15L and 15R in FIG. 1.

In the description of the embodiment in the present specification, a reference "R" is used to indicate a thing related to the right leg of the user A or to the right leg link 3R of the walking assistance device 1, and a reference "L" is used to indicate a thing related to the left leg of the user A or to the left leg link 3L of the walking assistance device 1. It should be noted, however, that the references R and L are often omitted if there is no need to particularly distinguish between left and right.

The seating section 2 is saddle-shaped and allows the user A to be seated on the top surface (seating surface) of the seating section 2 in a straddling manner (in a manner that the seating section 2 is positioned between the root ends of the legs of the user A). In the seating state, the seating section 2 comes in contact with the trunk (the upper part of the body) of the user A at the crotch of the user A. This enables the seating section 2 to apply an upward raising force for supporting a part of the weight of the user A to the user A. In the description of this embodiment, a vertical force acting on the user A from the seating section 2 is referred to as the raising force. In this instance, the forward direction of the raising force is assumed to be an upward direction. Therefore, the upward raising force means the positive raising force. More specifically, the vertical force acting on the seating section 2 from the user A is a reaction force of the raising force (an acting force equivalent to the raising force with an opposite sign).

Moreover, a front end 2$f$ and a rear end 2$r$ of the seating section 2 are projecting upward as shown in FIG. 1. This restricts the seating position (the position in an anteroposterior direction) of the user A relative to the seating section 2 to the position between the front end 2$f$ and the rear end 2$r$ of the seating section 2. The front end 2$f$ of the seating section 2 is formed in a furcate shape as shown in FIG. 2.

Moreover, the seating section 2 is secured to a seating section frame 2$a$ provided on the bottom surface of the seating section 2 via a force sensor 90. The force sensor 90 detects the raising force (or its reaction force) and corresponds to an acting force detection means in the present invention. Hereinafter, the force sensor 90 is referred to as a raising force sensor 90. Moreover, an acceleration sensor 80 is attached to the seating section frame 2$a$. Note that, however, the acceleration sensor 80 is used for a second embodiment described later and thus may be omitted in this embodiment.

Each leg link 3 includes a thigh frame 11 connected to the seating section frame 2$a$ through a first joint 10, a crus frame 13 connected to the thigh frame 11 through a second joint 12, and a third joint 14 connecting the crus frame 13 to a foot sole installation section 15.

The first joint 10 of each leg link 3 corresponds to a hip joint of the user A and allows a swing motion around a horizontal axis of the leg link 3 (an anteroposterior swing motion of the leg link 3) and a swing motion around an anteroposterior axis (adduction/abduction motion). The first joint 10 is disposed on the downside of the seating section frame 2$a$. More specifically, the first joint 10 includes a pair of pivot pins 20$f$ and 20$r$, which are coaxially disposed on an anteroposterior central axis C indicated by a long dashed short dashed line in FIG. 1 at the front side portion and the rear end portion of the seating section frame 2$a$, brackets 21$f$ and 21$r$ supported rotatably around the pivot pins 20$f$ and 20$r$, an arc-shaped guide rail 22 fixed to the lower end of the brackets 21$f$ and 21$r$, and a plate 23 movably supported by the guide rail 22 along the guide rail 22. The thigh frame 11 is extended diagonally forward and downward from the plate 23. The thigh frame 11 is an approximately rod-shaped member and is formed integrally with the plate 23.

The pivot pins 20$f$ and 20$r$ are fixed at the both ends (front and rear ends) thereof to the seating section frame 2$a$ through bearings 24$f$ and 24$r$ fixed to the bottom surface of the seating section frame 2$a$. The bracket 21$f$ is supported around the pivot pin 20$f$ with its upper end fitted to the outer periphery of the middle portion of the pivot pin 20$f$ so as to be rotatable around the central axis C of the pivot pin 20$f$. Similarly, the bracket 21$r$ is supported around the pivot pin 20$r$ with its upper end fitted to the outer periphery of the middle portion of the pivot pin 20$r$ so as to be rotatable around the central axis C of the pivot pin 20$r$. Therefore, the guide rail 22 of the first joint 10 swings together with the brackets 21$f$ and 21$r$ with the central axis C of the pivot pins 20$f$ and 20$r$ as a rotation axis. In this embodiment, the first joints 10R and 10L of the leg links 3R and 3L have a common central axis C. In other words, the first joint 10R of the leg link 3R and the first joint 10L of the leg link 3L share the pivot pins 20$f$ and 20$r$. More specifically, a bracket 21$f$R of the right first joint 10R and a bracket 21$f$L of the left first joint 10L are supported around the common pivot pin 20$f$. Similarly, a bracket 21$r$R of the right first joint 10R and a bracket 21$r$L of the left first joint 10L are supported around the common pivot pin 20$r$.

The plate 23 of the first joint 10 of each leg link 3 is disposed in close vicinity to the guide rail 22 in a posture parallel to a surface including the arc of the guide rail 22. A carrier 26 having a plurality of (for example, four) rotatable rollers 25 as shown in FIG. 1 is fixed to the plate 23. The rollers 25 of the carrier 26 are engaged with the upper surface (the inner peripheral surface) and the lower surface (the outer peripheral surface) of the guide rail 22 by the same number of the rollers 25 so as to freely roll. This allows the plate 23 to move freely along the guide rail 22. In this instance, the positional relationship between the guide rail 22 and the seating section 2 and the radius of the arc of the guide rail 22 are set in such a way that the central point P of the arc of the guide rail 22 exists above the seating section 2 when the walking assistance device 1 is viewed in the sagittal plane as shown in FIG. 1.

The structure of the first joint 10 described hereinabove allows the thigh frame 11 integrated with the plate 23 to swing freely around the anteroposterior rotation axis C of the user A and the swing motion enables the adduction/abduction motions of each leg link 3. Moreover, the thigh frame 11 integrated with the plate 23 is free to swing around a horizontal axis passing through the central point P (more accurately, around the axis perpendicular to the plane including the arc of the guide rail 22 and passing through the central point P), and the swing motion allows the leg links 3 to swing back and forth. Although the first joint 10 is capable of making a rotational motion around two axes in the anteroposterior and horizontal directions in this embodiment, alternatively the first joint may be made so as to further be capable of making a rotational motion around a vertical axis (internal/external rotation motion) (in other words, so as to be capable of making a rotational motions around three axes). Alternatively, the first joint may be a joint capable of making a rotational motion only around one horizontal axis (a joint capable of making only the forward/backward swing motion of each leg link 3).

Furthermore, the plate 23 of the first joint 10 of each leg link 3 extends from the location of the carrier 26 toward the backward of the seating section 2 when the walking assistance device 1 is viewed in the sagittal plane as shown in FIG. 1. Moreover, at the rear end of the plate 23, an electric motor 27 and a rotary encoder 28 as a rotation angle detection means which detects a rotation angle (rotation angle from a predetermined reference position) off a rotor of the electric motor 27 are attached to the plate 23 coaxially with each other. In this embodiment, the second joint 12 of the first to third joints 10, 12, and 14 of each leg link 3 is driven. The above electric motor 27 is an actuator that drives the second joint 12. In addition, the rotation angle detected by the rotary encoder 28 is used to measure a rotation angle (bending angle), as a displacement, of the second joint 12.

An electric motor 27L of the left leg link 3L and an electric motor 27R of the right leg link 3R correspond to an actuator for the left leg link and an actuator for the right leg link of the present invention, respectively. Each actuator may be a hydraulic or pneumatic actuator. In addition, each actuator may be fixed to, for example, the rear part of the seating section frame 2a through an appropriate bracket or fixed to the thigh frame 11 of each leg link 3. Alternatively, each actuator may be attached to the second joint 12 of each leg link 3 so as to drive the second joint 12 directly. Furthermore, a sensor for detecting a displacement of the second joint 12 (joint displacement sensor) may be directly attached to the second joint 12 of each leg link 3. Moreover, the joint displacement sensor may be a potentiometer or the like, instead of the rotary encoder.

The second joint 12 of each leg link 3 is a joint that corresponds to a knee joint of the user A and allows stretching and bending motions of the leg link 3. The second joint 12 connects the lower end of the thigh frame 11 to the upper end of the crus frame 13 through a pivot pin 29 having a central axis in the horizontal direction (more accurately, a central axis perpendicular to the surface including the arc of the guide rail 22). Moreover, the second joint 12 allows the crus frame 13 to be relatively rotatable with respect to the thigh frame 11 around the central axis of the pivot pin 29. The second joint 12 is provided with a stopper, which is not shown, to limit the rotatable range of the crus frame 13 with respect to the thigh frame 11.

The crus frame 13 of each leg link 3 is an approximately rod-shaped member extending diagonally downward from the second joint 12 of the leg link 3. More specifically, the crus frame 13 is formed by connecting a lower crus frame 13b that forms a part closer to the third joint 14 to a rod-shaped upper crus frame 13a that forms a part above the lower crus frame 13b with a force sensor 30 (which corresponds to a second force sensor in the present invention) interposed therebetween. The lower crus frame 13b is sufficiently shorter than the upper crus frame 13a. Therefore, the force sensor 30 is inserted into the crus frame 13 of each leg link 3 in the position closer to the foot sole installation section 15. The force sensor 30 is a three-axis force sensor which detects translational forces of three axes (a translational force in the axial direction perpendicular to the surface of the force sensor 30 and translational forces in two axial directions that are parallel to the surface of the force sensor 30 and that are orthogonal to each other). In this embodiment, however, only the detected values of the translational forces of two axes out of the detected translational forces of three axes are used as described later. Therefore, the force sensor 30 may be a two-axis force sensor which detects translational forces of two axes.

A pulley 31, which is rotatably integral with the crus frame 13, is secured to the upper end of the upper crus frame 13a of the crus frame 13 around the pivot pin 29 of the second joint 12. The ends of a pair of wires 32a and 32b serving as a driving force transmission means which transmits a rotational driving force of the electric motor 27 to the pulley 31 are secured to the outer periphery of the pulley 31. The wires 32a and 32b are drawn in the tangential direction of the pulley 31 from two places opposite to the diameter direction of the outer periphery of the pulley 31. The wires 32a and 32b pass through a rubber tube (a protecting tube for the wires), which is not shown, laid along the high frame 11 and connected to a rotary drive shaft (not shown) of the electric motor 27. In this case, the electric motor 27 applies tensions to these wires 32a and 32b so that one of the wires 32a and 32b is rewound by the pulley 31 while the other is drawn out of the pulley 31 when the rotary drive shaft of the electric motor 27 rotates in the forward direction, and one of the wires 32a and 32b is rewound by the pulley 31 while the other is drawn out of the pulley 31 when the rotary drive shaft of the electric motor 27 rotates in the reverse direction. Thus, the rotational driving force of the electric motor 27 is transmitted to the pulley 31 through the wires 32a and 32b so as to rotationally drive the pulley 31 (the crus frame 13 to which the pulley 31 is secured rotates around the central axis of the pivot pin 29 of the second joint 12 with respect to the thigh frame 11).

The lower end of the lower crus frame 13b of the crus frame 13 has a bifurcated section 13bb formed in a bifurcated shape, as shown in FIG. 3.

The third joint 14 of each leg link 3 is a joint corresponding to an ankle joint of the user A. In this embodiment, the third joint 14 is composed of a free joint 33 (see FIG. 3) which allows rotations around three axes, as shown in FIG. 3. The free joint 33 is attached to the bifurcated section 13bb of the lower crus frame 13b of the crus frame 13 to connect the lower end (the bifurcated section 13bb) of the crus frame 13 and a connecting portion 34 on the top of the foot sole installation section 15. This enables the foot sole installation section 15 to rotate with three degrees of freedom relative to the crus frame 13.

Each foot sole installation section 15 includes a shoe 35 which a foot of the user A is to be put on and a stirrup-shaped annular member 36 housed in the shoe 35 and secured to the connecting portion 34 at its upper end. The annular member 36 is made of highly-rigid metal or the like. As shown in FIG. 3, the annular member 36 is housed in the shoe 35 so that the flat bottom plate of the annular member 36 abuts against the internal bottom surface of the shoe 35 and the curved portion (side wall) of the annular member 36 extending to both ends of the bottom plate runs along the side wall of the shoe 35. Further, an insole member 37 (not shown in FIG. 1) is inserted in the shoe 35 in such a way as to cover the internal bottom surface of the shoe 35 and the bottom plate of the annular member 36. The connecting portion 34 is inserted in the shoe 35 through an opening of a shoestring installation section of the shoe 35.

To put the foot sole installation section 15 of each leg link 3 on each foot sole of the user A, the foot of the user A is inserted in the shoe 35 from the top opening of the shoe 35 by passing the toe portion of the foot through the annular member 36 and placing the insole member 37 on the bottom surface of the foot. Furthermore, the foot sole installation section 15 is installed on the foot sole by tightening the shoestring up.

On the bottom surface of the insole member 37 of the foot sole installation section 15, force sensors 38 and 39 are attached to a location on the front side of the shoe 35 (a location closer to the front than the bottom plate of the annular member 36) and to a location on the rear side of the shoe 35 (a location closer to the rear than the bottom plate of the annular member 36). Therefore, the force sensors 38 and 39 are disposed between the bottom surface of the foot sole of the user A and the bottom of the shoe 35 which is a ground contact portion of the foot sole installation section 15. The force sensor 38 on the front side is disposed so as to be substantially right below a metatarsophalangeal joint (MP joint) of the foot sole of the user A wearing the foot sole installation section 15. The force sensor 39 on the rear side is disposed so as to be substantially right below the heel of the foot sole. In this embodiment, these force sensors 38 and 39 are one-axis force sensors which detect translational forces in a direction perpendicular to the bottom surface (ground contact surface) of the foot sole installation section 15 (a direction substantially perpendicular to a floor surface in a state wherein a leg or legs of the user A are standing). Hereinafter, the force sensors 38 and 39 will be referred to as an MP sensor 38 and a heel sensor 39, respectively. The MP sensor 38 and the heel sensor 39 constitute the first force sensor in the present invention.

Additionally, the insole member 37 may be formed of a rigid material, though it may be formed of a flexible (pliable) material. If the insole member 37 is formed of a flexible material, providing the bottom surface thereof with a plurality of force sensors allows highly accurate detection of a force applied to each portion of the bottom surface of the foot sole of the user A. On the other hand, if the insole member 37 is formed of a rigid material, it is possible to detect a treading force of the entire foot sole of the user A more easily. This makes it possible to reduce the number of force sensors installed on the bottom surface of the insole member 37.

Moreover, in order to detect the treading force of each leg of the user A, the foot sole installation section 15 may have the configuration described below. Specifically, a flat plate-like foot sole supporting member (for example, a member in the same shape as the insole member 37) capable of supporting the foot sole of the user A from its bottom surface side is disposed inside the annular member 36. Furthermore, an arm member extended from both sides of the foot sole supporting member to the upper side of the instep of the foot is suspended from the inner surface upper end of the annular member 36 through a force sensor. In this instance, the foot sole supporting member and the arm member are kept from contact with the inner surface of the annular member 36 and of the shoe 35. This applies a force substantially equivalent to the treading force to the fore sensor, thereby enabling measurement of the treading force on the basis of an output of the force sensor.

The above describes the mechanical structure of the walking assistance device 1 according to this embodiment. Additionally, when the user A with a normal build stands up in an upright posture, the second joints 12 of the leg links 3 jut out forward beyond the legs of the user A. More specifically, the lengths of the thigh frame 11 and the crus frame 13 are set so that the sum of the lengths is slightly greater than the inside leg length of the user A with the normal build. The lengths of the thigh frame 11 and the crus frame 13 set as described above and the above stopper of the second joint 12 restrain the occurrence of a singular point state in which the thigh frame 11 and the crus frame 13 are aligned or a state in which the thigh frame 11 and the crus frame 13 bend in the opposite direction from that shown in FIG. 1. This prevents the control of the walking assistance device 1 from failing, which may be caused by the singular point state or the reverse bend state of the leg links 3.

The second joint of each leg link 3 may be a translatory joint.

Although the details will be discussed later, in the walking assistance device 1 constructed as described above, an upward raising force (a positive raising force) is applied from the seating section 2 to the user A by generating torques of the second joint 12 by the electric motor 27, with the foot sole installation section 15 being attached to the feet of the legs of the user A. At this time, floor reaction forces act on the supporting surfaces each between the foot sole installation section 15 and the floor. The resultant force between the floor reaction forces acting on the supporting surfaces of the foot sole installation sections 15 is a force that balances out the sum of the gravity acting on the user A, the gravity acting on the walking assistance device 1, and an inertial force generated by the operation of the walking assistance device 1, in other words, a reaction force acting from the floor against these gravities and inertial force. The gravity acting on the user A means a gravity (the product of the total weight and the gravitational acceleration constant) equivalent to the total weight of the user A including the wearing clothes of the user A (things the user A is wearing) and personal belongs. Moreover, the gravity acting on the walking assistance device 1 means the gravity (the product of the total weight and the gravitational acceleration constant) equivalent to the total weight of the walking assistance device 1 including the control device described later.

The reaction force acting on the walking assistance device 1 and the user A from the floor side against the gravity and the inertial force as described above is referred to as a supporting force in this specification. The resultant force between the floor reaction forces acting on the supporting surfaces of the foot sole installation sections 15 will be hereinafter referred to as the total supporting force. Although a "force" generally consists of a translational force component and a moment component, the term "force means a translational force in this specification.

More specifically, the above inertial force is sufficiently small when the user A is almost stationary or the user A is performing movements slowly. In this state, the total supporting force almost matches a force (a vertical translational force) that balances out the sum of the gravity acting on the user A and the gravity acting on the walking assistance device 1.

In the walking assistance device 1 according to this embodiment, only the foot sole installation sections 15, 15 are restrained by being attached to the user A. Each foot sole installation section 15 includes the annular member 36. Therefore, the gravity acting on the walking assistance device 1, the load received by the walking assistance device 1 from the user A (a reaction force of the raising force) through the seating section 2, and the inertial force (more specifically, the vertical inertial force) generated by the walking assistance device 1 hardly act on the user A, but act on the floor surface from the leg links 3, 3 through the annular members 36, 36 of the foot sole installation sections 15, 15, respectively.

Accordingly, the walking assistance device 1 receives, from the floor side, a supporting force against the sum of the gravity acting on the walking assistance device 1, the load imposed on the walking assistance device 1 from the user A through the seating section 2, and the vertical inertial force generated by the walking assistance device 1. The term "supporting force" means a supporting force borne by the walking assistance device 1 out of the total supporting force. Hereinafter, the supporting force borne by the walking assistance device 1 as described above is referred to as the borne-by-the-device supporting force.

When the both legs of the user A are standing (when both foot sole installation sections 15, 15 of the walking assistance device 1 are in contact with the ground), the borne-by-the-device supporting force is dividedly borne by the pair of the left leg link 3L and the foot sole installation section 15L and a pair of the right leg link 3R and the foot sole installation sections 15R. More specifically, a part of the borne-by-the-device supporting force is borne by one leg link 3 and the remainder of the supporting force is borne by the other leg link 3. On the other hand, when only one of the legs of the user A is standing (when the other leg is a swing leg), all of the borne-by-the-device supporting force is borne by the pair of the standing leg link 3 and foot sole installation section 15. Hereinafter, the supporting force borne by each pair of the leg link 3 and the foot sole installation section 15 out of the borne-by-the-device supporting force is referred to as the leg link supporting force. Additionally, the supporting force borne by the pair of the right leg link 3R and the right foot sole installation section 15R is referred to as the right leg link supporting force, and the supporting force borne by the pair of the left leg link 3L and the left foot sole installation section 15L is referred to as the left leg link supporting force. The total sum of the left leg link supporting force and the right leg link supporting force matches the borne-by-the-device supporting force.

The supporting force against the sum of the gravity acting on the walking assistance device 1 and the vertical inertial force generated in the walking assistance device 1, in other words, a supporting force obtained by subtracting the raising force acting from the seating section 2 on the user A from the borne-by-the-device supporting force corresponds to a device weight compensation force in the present invention. The term "device weight compensation force" means supporting force acting on the walking assistance device 1 caused by the weight of the walking assistance device 1 itself.

On the other hand, the supporting force obtained by subtracting the borne-by-the-device supporting force from the total supporting force acts on the legs of the user A from the floor side and the supporting force is borne by the legs of the user A. Hereinafter, the supporting force borne by the user A is referred to as the borne-by-the-user supporting force. When both legs of the user A are standing, the borne-by-the-user supporting force is dividedly borne by the legs of the user A. More specifically, a part of the borne-by-the-user supporting force is borne by one leg and the remainder of the supporting force is borne by the other leg. When only one leg of the user A is standing, all of the borne-by-the-user supporting force is borne by the leg. Hereinafter, the supporting force borne by each leg (the supporting force acting on each leg from the floor side) in the borne-by-the-user supporting force will be referred to as the user's leg supporting force. Moreover, the supporting force borne by the right leg is referred to as the user's right leg supporting force and the supporting force borne by the left leg is referred to as the user's left leg supporting force. The total sum of the user's left leg supporting force and the user's right leg supporting force matches the borne-by-the-user supporting force.

In addition, the force that the user A applies to push the foot sole of each leg against a floor surface to support himself/herself is referred to as a treading force of the leg. The treading force of each leg balances out the user's leg supporting force.

Supplementarily, in the landing state of the foot sole installation section 15 connected to each leg link 3, the force sensor 30 provided in each leg link 3 receives a supporting force obtained by subtracting the supporting force against the gravity acting on the portion (mainly the foot sole installation section 15) below the force sensor 30 of the leg link 3 from the leg link supporting force related to the leg link 3. Then, the components in three-axis directions (or the components in two-axis directions) of the supporting force acting on the force sensor 30 are detected by the force sensor 30. The weight of the portion (mainly the foot sole installation section 15) below the force sensor 30 provided in each leg link 3 is sufficiently small in comparison with the total weight of the walking assistance device 1. Therefore, the force acting on the force sensor 30 almost equals the leg link supporting force. Accordingly, the force sensor 30 of each leg link 3 substantially detects the leg link supporting force corresponding to the leg link 3. In the subsequent description, the force sensor 30 is referred to as the supporting force sensor 30. Moreover, the total sum of the supporting forces acting on the supporting force sensors 30 for the leg links 3, 3 is referred to as the total raising force (approximately equal to the borne-by-the-device supporting force). Further, the share of each leg link 3 in the total raising force is referred to as the total raising force share (approximately equal to the leg link supporting force).

The total sum of the forces acting on the MP sensor 38L and the heel sensor 39L of the left foot sole installation section 15L corresponds to the above-mentioned user's left leg supporting force (or the treading force of the left leg), and the total sum of the forces acting on the MP sensor 38R and the heel sensor 39R of the right foot sole installation section 15R corresponds to the above-mentioned user's right leg supporting force (or the treading force of the right leg). Although the MP sensor 38 and the heel sensor 39 are one-axis force sensors in this embodiment, they may alternatively be, for example, two-axis force sensors that detect also translational forces in directions substantially parallel to the bottom surface of the shoe 33 or may be three-axis force sensors. The MP sensor 38 and the heel sensor 39 desirably are sensors capable of detecting translational forces in directions substantially perpendicular at least to the bottom surface of the shoe 33 or the floor surface.

Although the annular member 36 has been used in this embodiment to cause the gravity acting on the walking assistance device 1, the load (the reaction force of the raising force) imposed on the walking assistance device 1 from the user A through the seating section 2, and the inertial force (more specifically, the vertical inertial force) generated in the walking assistance device 1 to act on the floor surface substantially without acting on the user A, alternatively it is possible to use a member without one of both sides (curved portions) of the annular member 36, for example.

Subsequently, the description will be made for a control device for controlling the operations (the operations of the electric motors 27R and 27L) of the walking assistance device 1 constructed as described above.

FIG. 4 is a block diagram schematically showing the configuration (hardware configuration) of the control device 50. As shown in the figure, the control device 50 includes an arithmetic processing section 51 composed of a microcomputer (a CPU, a RAM, and a ROM) and an input/output circuit (an A/D converter or the like), driver circuits 52R and 52L for the electric motors 27R and 27L, respectively, an assist ratio and mode setting key switch 53 for setting a target assist ratio, which is a target value of a ratio of the magnitude of an upward raising force (an upward translational force acting on the user A from the seating section 2) to the total sum of the actual treading forces of the left and right legs of the user A, and the mode for specifying how to decide the target raising force, which is a target value of the raising force, a raising control ON/OFF switch 54 for selecting whether or not to generate the raising force of the user A, a power battery 55, and a power circuit 57 that is connected to the power battery 55 through a power switch 56 (ON/OFF switch) and supplies power from the power battery 55 to the circuits 51, 52R, and 52L of the control device 50 when the power switch 56 is turned on (closed).

The control device 50 is secured to the rear end of the seating section frame 2a or to the plates 23R and 23L through a bracket (not shown). The assist ratio and mode setting key switch 53, the raising control ON/OFF switch 54, and the power switch 56 are mounted on the outer surface of the housing (not shown) of the control device 50 so that they are accessible for control. The assist ratio and mode setting key switch 53 is formed of a ten-key switch or a plurality of selector switches to permit direct setting of the target assist ratio or mode or selective setting from among a plurality of types of target values prepared beforehand. More specifically, there are two types of modes settable by the assist ratio and mode setting key switch 53 in this embodiment.

Connected to the control device 50 are the raising force sensor 90, the MP sensors 38R and 38L, the heel sensors 39R and 39L, the supporting force sensors 30R and 30L, and the rotary encoders 28R and 28L via connecting lines which are not shown. The output signals of these sensors are entered into the arithmetic processing section 51. The arithmetic processing section 51 receives control signals of the assist ratio and mode setting key switch 53 and the raising control ON/OFF switch 54 (signals indicating the operation statuses of the switches). Further, the control device 50 is connected to the electric motors 27R and 27L through connecting lines, which are not shown, to supply current to the electric motors 27R and 27L from the driver circuits 52R and 52L, respectively. The arithmetic processing section 51 determines command values of current (hereinafter, referred to as the indicator current values) for energizing the electric motors 27R and 27L by arithmetic processing (control processing) described later. The arithmetic processing section 51 controls the driver circuits 52R and 52L on the basis of the indicator current values so as to control the generated torques (driving forces) of the electric motors 27R and 27L.

Output signals (voltage signals) of the raising force sensor 90, the MP sensors 38R and 38L, the heel sensors 39R and 39L, and the supporting force sensors 30R and 30L may be amplified by a preamplifier in the vicinity of these sensors and then input to the control device 50. The output signals of the raising force sensor 90, the MP sensors 38R and 38L, the heel sensors 39R and 39L, and the supporting force sensors 30R and 30L are amplified and then the voltage values thereof are subjected to A/D conversion before the amplified output signals are supplied to the arithmetic processing section 51.

The arithmetic processing section 51 has functional means as shown in the block diagram of FIG. 5 as its main functional means. The functional means is a function implemented by a program stored in the ROM.

Referring to FIG. 5, the arithmetic processing section 51 has a right treading force measuring means 60R to which output signals of the MP sensor 38R and the heel sensor 39R of the right leg link 3R are supplied and a left treading force measuring means 60L to which output signals of the MP sensor 38L and the heel sensor 39L of the left leg link 3L are supplied. The right treading force measuring means 60R is a means for carrying out the processing for measuring the magnitude of a treading force of the right leg of the user A (the magnitude of the user's right leg supporting force) from the voltage values of output signals of the MP sensor 38R and the heel sensor 39R. Similarly, the left treading force measuring means 60L is a means for carrying out the processing for measuring the magnitude of a treading force of the left leg of the user A (the magnitude of the user's left leg supporting force) from the voltage values of output signals of the MP sensor 38L and the heel sensor 39L). The treading force measuring means 60R and 60L correspond to the treading force measuring means in the present invention.

The arithmetic processing section 51 includes a right knee angle measuring means 61R and a left knee angle measuring means 61L to which output signals (pulse signals) of the rotary encoders Rotary encoder 28 and 28L are supplied, respectively. The knee angle measuring means 61R and 61L are means for measuring the bending angles in the bending angles in the second joints 12 (the displacements of the second joints 12) of the leg links 3 corresponding thereto on the basis of the input signals. The second joint 12 of each leg link 3 corresponds to the knee joint of the leg link 3, and therefore the bending angle in the second joint 12 is hereinafter referred to as the knee angle.

The arithmetic processing section 51 also includes a right supporting force measuring means 62R to which output signals of the supporting force sensor 30R of the right leg link 3R and knee angles of the right leg link 3R measured by the right knee angle measuring means 61R are supplied, and a left supporting force measuring means 62L to which output signals of the supporting force sensor 30L of the left leg link 3L and knee angles of the left leg link 3L measured by the left knee angle measuring means 61L are supplied. The right supporting force measuring means 62R is a means which carries out the processing for measuring the supporting force acting on the supporting force sensor 30R out of the right leg link supporting force, i.e., the total raising force share for the right leg link 3R, on the basis of a received output signal of the supporting force sensor 30R and a measurement value of a knee angle of the right leg link 3R. Similarly, the left supporting force measuring means 62L is a means which carries out the processing for measuring the supporting force acting on the supporting force sensor 30L out of the left leg link supporting force, i.e., the total raising force share for the left leg link 3L, on the basis of a received output signal of the supporting force sensor 30L and a measurement value of a knee angle of the left leg link 3L. These supporting force measuring means 62R and 62L correspond to the force-to-be-controlled measuring means in the present invention.

The arithmetic processing section 51 includes a left/right target share determining means 63, which receives the measurement values of the measuring means 60R, 60L, 61R, 61L, 62R, and 62L, output signals of the raising force sensor 90, and the control signals of the assist ratio and mode setting key switch 53 and the raising control ON/OFF switch 54. The left/right target share determining means 63 is a means which carries out processing for determining a target raising force, which is a target value of an upward raising force applied to the user A from the seating section 2, and a target total raising force, which is a target value of the total raising force (borne-by-the-device supporting force) and also for determining the target value of a share for each leg link 3 relative to the target total raising force, i.e., the target value of the total raising force share for each leg link 3 (hereinafter, referred to simply as a control target value). The control target value corresponds to a target share in the present invention. The target raising force corresponds to a target acting force in the present invention. Moreover, the left/right target share determining means 63 has a function as a target acting force setting means, a function as a target total raising force determining means, a function as a distribution means, and a function as a device weight compensation force estimating means.

Moreover, the arithmetic processing section 51 includes an electric motor control input determining means 64 which receives a total raising force share for each leg link 3 measured by the supporting force measuring means 62, the knee angle of each leg link 3 measured by the knee angle measuring means 61, the target raising force determined by the left/right target share determining means 63 and the control target value of each leg link, and output signals of the raising force sensor 90. The electric motor control input determining means 64 is a means which determines the control input (the indicator current value) relative to each electric motor 27 in such a way as that the actual total raising force share of each leg link 3 becomes a target share while approximating a detected value of the raising force indicated by the output signal of the raising force sensor 90 to the target raising force, on the basis of the input values.

The electric motor control input determining means 64 corresponds to an actuator control means in the present invention.

The above is the overview of the arithmetic processing function of the arithmetic processing section 51.

The acceleration sensor 80 shown in FIGS. 4 and 5 and dashed arrows corresponding thereto relate to the second embodiment and are unnecessary in this embodiment.

Subsequently, the control processing of the control device 50 according to this embodiment will now be described below, including detailed description of the processing of the arithmetic processing section 51. In the walking assistance device 1 according to this embodiment, if the power switch 56 is OFF, no driving force is imparted to the second joints 12 of the leg links 3. This allows the joints 10, 12, and 14 to freely move. In this state, the leg links 3 are folded by their own weights. In this state, each foot sole installation section 15 is attached to each foot of the user A, and then the user A or an attendant lifts the seating section 2 and positions the seating section 2 under the crotch of the user A.

Subsequently, when the power switch 56 is turned on, power is supplied to the circuits of the control device 50, thus activating the control device 50. If the raising control ON/OFF switch 54 is turned on in this state, the arithmetic processing section 51 performs processing described below at predetermined control processing cycles.

In each control processing cycle, the arithmetic processing section 51 first performs the processing of the treading force measuring means 60R and 60L. This processing will be described below with reference to FIG. 6. FIG. 6 is a block diagram showing the flows of the processing by the treading force measuring means 60R and 60L. The treading force measuring means 60R and 60L share the same algorithm of processing. Therefore, any components related to the left treading force measuring means 60L are shown in parentheses in FIG. 6.

Typically describing the processing of the right treading force measuring means 60R, first, a detected value of the MP sensor 38R (the detected value of a force indicated by an output voltage value of the MP sensor 38R) and a detected value of the heel sensor 39R (the detected value of a force indicated by an output voltage of the heel sensor 39R) of the leg link 3R are passed through low-pass filters in S101 and S102, respectively. The low-pass filters remove high-frequency components, such as noises, from the detected values of the sensors 38R and 39R. The cutoff frequencies of the low-pass filters are set to, for example, 100 Hz.

Subsequently, the outputs of the low-pass filters are added in S103. This provides a provisional measurement value FRF_p_R of the treading force of the right leg of the user A. The provisional measurement value FRF_p_R contains an error component resulting mainly from the tightening of the shoestring of the right foot sole installation section 15R.

Hence, in this embodiment, the provisional measurement value FRF_p_R is further subjected to conversion processing in S104. This provides a final measurement value FRF_R of the treading force of the right leg of the user A. The conversion processing of S104 is performed according to the table shown in FIG. 7. More specifically, if FRF_p_R is equal to or less than a predetermined first threshold value FRF1, the measurement value FRF_R is set to zero. This prevents a very small error component attributable mainly to the tightening of the shoestring of the foot sole installation section 15R from being obtained as the measurement value FRF_R. If the provisional measurement value FRF_p_R is larger than the first threshold value FRF1 and equal to or less than a second threshold value FRF2 (>FRF1), the measurement value FRF_R is linearly increased as the value of FRF_p_R increases. If FRF_p_R exceeds the second threshold value FRF2, the value of FRF_R is maintained at a predetermined upper limit (the value of FRF_R obtained when FRF_p_R equals the second threshold value FRF2). The reason for setting the upper limit of FRF_R is described later.

The above has described the processing of the right treading force measuring means 60R. The same processing applies to the left treading force measuring means 60L.

The arithmetic processing section 51 then sequentially performs the processing of the knee angle measuring means 61R and 61L and the processing of the supporting force measuring means 62R and 62L. The above processing will be described below with reference to FIG. 8 and FIG. 9. FIG. 8 is a block diagram showing the flows of the processing of the knee angle measuring means 61R and 61L and the processing of the supporting force measuring means 62R and 62L. The knee angle measuring means 61R and 61L share the same processing algorithm. The supporting force measuring means 62R and 62L also share the same processing algorithm. For this reason, any components related to the left knee angle measuring means 61L and the left supporting force measuring means 62L are shown in parentheses in FIG. 8.

The processing of the right knee angle measuring means 61R and the right supporting force measuring means 62R will be described as representative processing below. First, the right knee angle measuring means 61R performs the processing of S201 and S202 to thereby obtain a measurement value $\theta 1\_R$ of a knee angle of the right leg link 3R (the bending angle of the leg link 3R in the second joint 12R). In S201, a provisional measurement value $\theta 1p\_R$ of a knee angle of the leg link 3R is calculated from an output of the rotary encoder 28R.

Referring now to FIG. 9, in this embodiment, an angle $\theta 1\_R$ formed by a segment S1 that connects the central point P related to the first joint 10R of the leg link 3R (the point P provides the center of rotation of forward/backward swing motions of the thigh frame 11R; the point P is hereinafter referred to as the forward/backward swing central point P) and the central point of the second joint 12R and a segment S2 that connects the central point of the second joint 12R and the central point of the third joint 14R is measured as the knee angle of the right leg link 3R. The same applies to the knee angle of the left leg link 3L. FIG. 9 schematically shows the construction of the essential section of the leg link 3.

In this case, in S201 described above, the reference rotational position of the second joint 12R is defined in a state wherein the thigh frame 11R and the crus frame 13R of the leg link 3R have a predetermined posture relationship (for example, the posture state shown in FIG. 1), that is, in the state wherein the knee angle θ1_R takes a predetermined value. Then, a rotation amount from the reference rotational position (the amount of change in rotation angle, and it is proportional to the rotation amount of the rotor of the electric motor 27R) is measured from an output signal of the rotary encoder 28R. The value obtained by adding the measured rotation amount of the second joint 12R to the value of a knee angle of the leg link 3R at the above reference rotational position (which is stored in a memory, which is not shown, beforehand) is determined as the provisional measurement value θ1p_R.

The provisional measurement value θ1p_R sometimes contains a high-frequency noise component. Hence, the θ1p_R is passed through a low-pass filter in S202 to finally obtain a measurement value θ1_R of a knee angle of the leg link 3R.

The above has described the processing of the right knee angle measuring means 61R. The same processing applies to the left knee angle measuring means 61L.

Supplementarily, in this embodiment, the reason for measuring the angle θ1 formed by the segments S1 and S2 as the knee angle of the leg link 3 is because the measurement value of the angle θ1 is used mainly in the processing of the left/right target share determining means 63, the details of which will be discussed later.

In the walking assistance device 1 according to this embodiment, however, the angle formed by the central axis of the thigh frame 11 of each leg link 3 and the segment S1 is constant. Therefore, in each knee angle measuring means 61, the angle formed by, for example, the central axis of the thigh frame 11 of the leg link 3 and the segment S2 related to the crus frame 13 may be determined beforehand as the knee angle of the leg link 3. The angle θ1 may be determined from the knee angle by the processing of the left/right target share determining means 63, which will be described later.

After the measurement value θ1_R of the knee angle of the leg link 3R is determined as described above, the processing of the right supporting force measuring means 62R is performed in S203. This processing includes the calculation of a measurement value Fankle_R of a supporting force acting on the supporting force sensor 30R (in other words, the total raising force share for the leg link 3R) from the measurement value θ1_R of the knee angle obtained in S202 and the detected values of the supporting force sensor 30R (the detected values of the forces of two axes indicated by the voltage values of output signals of the supporting force sensor 30R). This processing will be described in detail below with reference to FIG. 9.

The supporting force (the total raising force share) Fankle_R acting on the supporting force sensor 30R of the leg link 3R is substantially equal to the translational force acting on the crus frame 13R from the third joint 14R of the leg link 3R. Further, in the walking assistance device 1 according to this embodiment, the direction of the translational force and consequently the direction of Fankle_R are parallel to the segment S3 that connects the central point of the third joint 14 of the leg link 3R and the forward/backward swing central point P.

Meanwhile, the supporting force sensor 30R detects a force Fz in a z-axis direction perpendicular to the surface (the upper surface or the lower surface) of the supporting force sensor 30R and a force Fx in an x-axis direction, which is perpendicular to the z-axis and parallel to the surface of the supporting force sensor 30R, as shown in the figure. The x-axis and the z-axis are coordinate axes fixed to the supporting force sensor 30R, and are parallel to a plane that includes the arc of the guide rail 22. At this time, the detected Fz and Fx denote a component in the z-axis direction and a component in the x-axis direction, respectively, of Fankle_R. Accordingly, as illustrated, if the angle formed by Fankle_R and the z-axis is denoted as θk, Fankle_R may be calculated according to the following expression (1) from the detected values of Fz and Fx and θk.

$$Fankle\_R = Fx \cdot \sin\theta k + Fz \cdot \cos\theta k \quad (1)$$

The angle θk is determined as follows. If the angle formed by the segment S2 and the segment S3 (=the angle formed by the direction of Fankle and the segment S2) is denoted as θ2, lengths L1 and L2 of the segments S1 and S2, respectively, in a triangle having the segments S1, S2, and S3 as its three sides are set to constant values (known values set in advance). The angle θ1 formed by the segments S1 and S2 is the measurement value θ1_R obtained as described above in relation to the right knee angle measuring means 61R. Therefore, the angle θ2 is determined by geometric calculation from the lengths L1 and L2 (these values are stored in a memory beforehand) of the segments S1 and S2, respectively, and the measurement value θ1_R of the angle θ1.

Specifically, in the triangle having the segments S1, S2, and S3 as its three sides, the relational expressions of (2) and (3) given below hold. Note that L3 denotes the length of the segment S3.

$$L3^2 = L1^2 + L2^2 - 2 \cdot L1 \cdot L2 \cdot \cos\theta 1 \quad (2)$$

$$L1^2 = L2^2 + L3^2 - 2 \cdot L2 \cdot L3 \cdot \cos\theta 2 \quad (3)$$

Thus, L3 may be calculated according to expression (2) from the values of L1 and L2 and the measurement value of the angle θ1. Then, the angle θ2 may be calculated according to expression (3) from the calculated value of L3 and the values of L1 and L2.

Further, if the angle formed by the z-axis and the segment S2 is denoted by θ3, this angle θ3 takes a constant value set beforehand on the basis of the angle at which the supporting force sensor 30 is mounted on the crus frame 13. Then, the value of an angle θk required for the calculation of expression (1) may be determined by subtracting the angle θ2 calculated as described above from the angle θ3 of the constant value (this value is stored in a memory, which is not shown, beforehand).

Thus, in the processing of S203 of the right supporting force measuring means 62R in this embodiment, the measurement value Fankle_R of the total raising force share for the right leg link 3R is obtained according to the above expression (1) from θk calculated as described above and the detected values Fx and Fz of the supporting force sensor 30 of the leg link 3R.

The above has described the detailed description of the processing of S203 of the right supporting force measuring means 62R. The same applies to the processing of the left supporting force measuring means 62L.

In this embodiment, the supporting force sensor 30 is a three-axis force sensor or a two-axis force sensor so as to obtain the measurement value Fankle of the total raising force share for each leg link according to the above expression (1). Even if the supporting force sensor 30 is a one-axis force sensor, however, it is possible to obtain the measurement value Fankle. For example, if the supporting force sensor 30 is a sensor that detects only the force Fx in the x-axis direction shown in FIG. 9, the measurement value Fankle may be determined according to expression (4) given below. If the supporting force sensor 30 is a sensor that detects only the force Fz in the z-axis direction shown in FIG. 9, the measurement value Fankle may be determined according to expression (5) given below.

$$\text{Fankle} = Fx/\sin \theta k \qquad (4)$$

$$\text{Fankle} = Fz/\cos \theta k \qquad (5)$$

However, using the above expression (4) or (5) leads to deteriorated accuracy in the value of Fankle as the value of the angle θk approaches 0 degrees or 90 degrees. For this reason, it is desirable to use expression (1) to obtain the measurement values of Fankle.

Alternatively, the measurement value Fankle may be obtained by determining the square root of the sum of a square value of Fx and a square value of Fz. In this case, the measurement value θ1 of the knee angle is unnecessary.

Supplementarily, the processing of the measuring means 60, 61, and 62 described above does not necessarily have to be performed in sequential order. For example, they may alternatively be performed in parallel by a time-sharing manner or the like. If, however, θ1 is used in the processing of the supporting force measuring means 62R and 62L, then the processing of the knee angle measuring means 61R and 61L need be performed before the processing of the supporting force measuring means 62R and 62L.

In this embodiment, a supporting force sensor 30 for measuring the total raising force share for the leg links 3 is located between the third joint 14 and the crus frame 13 (more accurately, the upper crus frame 13a). Alternatively, however, the supporting force sensor may be installed between the third joint 14 and the foot sole installation section 15 (for example, between the third joint 14 and the connecting portion 34 of the foot sole installation section 15). In this case, the supporting force acting on the crus frame 13 from the third joint 14 may be measured by measuring the rotation angle of the third joint 14 and coordinate-transforming the supporting force detected by the supporting force sensor positioned between the third joint 14 and the foot sole installation section 15.

Subsequently, the arithmetic processing section 51 performs the processing of the left/right target share determining means 63. This processing will be described in detail below with reference to FIG. 10. FIG. 10 is a block diagram showing the flow of the processing of the left/right target share determining means 63.

In S301, calculation is made to determine the total sum (hereinafter, referred to as the treading force sum) of the measurement value FRF_R of the treading force of the right leg and the measurement value FRF_L of the treading force of the left leg, obtained as described above by the treading force measuring means 60.

Subsequently, the treading force sum (FRF_R+FRF_L) is multiplied by the target assist ratio, which has been set by the assist ratio and mode setting key switch 53, in S302. This determines a provisional target raising force, which is the provisional value of the target raising force.

Subsequently, the provisional target raising force is passed through a limiter in S303, by which the target raising force (>0) is determined. The limiter forcibly determines a predetermined positive lower limit as a target raising force if the provisional target raising force is smaller than the lower limit. Moreover, the limiter determines a predetermined positive upper limit as a target raising force if the provisional target raising force is smaller than the upper limit. Further, if the provisional target raising force is greater than the lower limit and smaller than the upper limit, the limiter directly determines the provisional target raising force as the target raising force.

In this embodiment, the lower limit and the upper limit of the limiter in S303 are selectively determined according to the mode set by the assist ratio and mode setting key switch 53. There are two types of modes as the above mode, the first mode and the second mode, in this embodiment. In the first mode, the target raising force is variably determined according to the treading force sum between the lower limit and the upper limit. The lower limit and the upper limit in the first mode are values determined in advance so as to satisfy the expression "0<the lower limit<the upper limit." Hereinafter, the lower limit and the upper limit of the target raising force in the first mode are denoted by fmin and fmax, respectively.

On the other hand, the second mode is used to determine the target raising force as a constant value independent of the treading force sum. The lower limit and the upper limit of the target raising force in the second mode are set to values determined in advance so as to satisfy the expression "the lower limit=the upper limit" (>0). In the second mode, the lower limit and the upper limit of the target raising force are previously set as described above. This causes the target raising force to be set to the constant value (=the lower limit=the upper limit) so as to be independent of the treading force sum as a result. Hereinafter, the lower limit and the upper limit of the target raising force in the second mode will be denoted by fx.

As described above, the limiter in S303 determines the target raising fore as shown in FIG. 11(a) or FIG. 11(b) relative to the treading force sum for the respective modes. FIG. 11(a) is a graph representing the relationship between the treading force sum and the target raising force in the first mode. In FIG. 11(a), the graph indicated by a solid line shows a state where the target assist ratio is relatively large, and a graph indicated by a broken line shows a state where the target assist ratio is relatively small. As shown by the solid line graph of FIG. 11(a), if the treading force sum is less than the value Fmin (=fmin/assist ratio), in other words, if the treading force sum is close to zero, the target raising force is maintained at the lower limit fmin in the first mode. Further, if the treading force sum is equal to or more than the value Fmin and equal to or less than the value Fmax (=fmax/assist ratio), the target raising force is determined to be a value proportional to the treading force sum (the treading force sum x the assist ratio). Moreover, if the treading force sum exceeds the value Fmax, the target raising force is maintained at the upper limit fmax. The same applies to the broken line graph of FIG. 11(a).

In the first mode, the target raising force is determined in this way so as to vary according to the treading force sum between fmin and fmax in the first mode. Since fmin>0 is satisfied in this instance, the target raising force is maintained at a positive value (in other words, an upward translational force) even if the treading force sum is close to zero (for example, in a state just before the feet of the user A leave the floor together with the foot sole installation sections 15R and 15L when the user A is to jump or in a state where the user A exists in the air together with the walking assistance device 1 after the feet leave the floor), as well as in a state where the treading force sum is relatively large (such as during walking). The reason why the target raising force is limited to a level under the upper limit fmax in the first mode is to prevent an excess target raising force from being set in response to a temporary impact force at the time of landing of the legs of the user A (at the time of landing of the foot sole installation sections 15).

Moreover, FIG. 11(*b*) is a graph indicating a relationship between the target raising force and the treading force sum in the second mode. As shown in the figure, the target raising force is maintained at a positive constant value fx (=the upper limit=the lower limit), independently of the treading force sum or the target assist ratio in the second mode. It is desirable that the value fx (>0) of the target raising force in the second mode is variably settable by the assist ratio and mode setting key switch 53.

More specifically, in the second mode, the processing of S301, S302, and S303 do not always need to be performed, but the value fx set by the assist ratio and mode setting key switch 53 or the like may be directly determined as a target raising force.

Moreover, it is desirable to select the second mode generally in a state where the user A stands motionlessly or a state where the user A is walking slowly. On the other hand, it is desirable to select the first mode in a state where the user A is to jump or to move relatively quickly or where the user A performs stepping exercise.

Returning to the description of FIG. 10, the target raising force is determined as described above, and then in S304, the device weight compensation force is estimated which is a supporting force against the sum of the gravity acting on the walking assistance device 1 and the inertial force generated in the walking assistance device 1. The estimation processing will be described later.

Thereafter, in S305, the target total raising force, which is a target value of the total raising force, is determined by adding the estimated value of the device weight compensation force to the target raising force.

Although not shown, if the raising control ON/OFF switch 54 is off in this embodiment, the target total raising force is determined by passing a value (corresponding to a measurement value of the total raising force), which is obtained by adding the measurement value Fankle_R of the total raising force share of the right leg link 3R determined as described above by the supporting force measuring means 62 and the measurement value Fankle_L of the total raising force share of the left leg link 3L, through the low-pass filter. Therefore, the target total raising force in this instance is always determined so as to maintain the current actual total raising force.

On the other hand, in S306, a distribution ratio (corresponding to a target ratio in the present invention), which is a ratio for distributing a target total raising force to the left and right leg links 3, is determined on the basis of the magnitude of the measurement value FRF_R of a treading force of the right leg and the magnitude of the measurement value FRF_L of a treading force of the left leg that have been determined by the treading force measuring means 60. This distribution ratio is composed of a right distribution ratio, which is the ratio of allocation to the right leg link 3R, and a left distribution ratio, which is the ratio of allocation to the left leg link 3L, of a target total raising force, and the sum of both distribution ratios is 1.

In this case, the right distribution ratio is determined to be FRF_R/(FRF_R+FRF_L), which is the ratio of the magnitude of FRF_R relative to the sum of the magnitude of the measurement value FRF_R and the magnitude of the measurement value FRF_L. Similarly, the left distribution ratio is determined to be FRF_L/(FRF_R+FRF_L), which is the ratio of the magnitude of FRF_L relative to the sum of the magnitude of the measurement value FRF_R and the magnitude of the measurement value FRF_L. In this case, in a state where one of the legs of the user A is a standing leg, while the other leg is a free leg (in other words, in a one-leg supporting state), the distribution ratio for the free leg is zero, and the distribution ratio for the standing leg is 1.

The following describes the reason for setting an upper limit of the measurement value FRF of a treading force of each leg in the conversion processing in S104 of each treading force measuring means 60 (see FIG. 6). In a state where both legs of the user A are standing (in other words, the state in a two-leg supporting period), the provisional measurement value FRF_p of a treading force of each leg generally does not smoothly change, but tends to frequently fluctuate. In such a case, if the left and right distribution ratios were determined on the basis of the provisional measurement value FRF_p, then the distribution ratio would frequently change and the allocation ratio of each leg link 3 out of a target total raising force would be apt to change frequently. As a result, a minute change would easily occur in a raising force acting on the user A from the seating section 2, and consequently the minute change may cause the user A to feel uncomfortable. For this reason, in this embodiment, an upper limit of the measurement value FRF of a treading force of each leg has been set to prevent frequent changes in the left and right distribution ratios in the state of the two-leg supporting period. In this case, in the state of the two-leg supporting period, both the left and right distribution ratios are basically maintained at ½ except for a period immediately after the start of the two-leg supporting period and a period immediately before the end thereof, thus stabilizing the left and right distribution ratios.

In the above FIG. 7, the measurement value FRF_R(L) may be obtained according to the table which has only the threshold value FRF1 and in which the measurement value FRF_R(L) of a treading force linearly increases if the provisional measurement value FRF_p_R(L) of a treading force of each leg of the user A is equal to or more than the threshold value FRF1. The threshold values FRF1, FRF2, and the like of the table for obtaining FRF_R(L) from the provisional measurement value FRF_p may be appropriately determined according to the raising force that feels comfortable to the user A, the weight of the walking assistance device 1, the calculation capability of the control device 50, and the like.

More specifically, the right distribution ratio and the left distribution ratio determined in the processing of S306 are used in the above processing of S304 in this embodiment. Therefore, the processing of S306 is performed before the processing of S304 and S305. Moreover, if the treading force sum is smaller than a predetermined value close to zero (including a case where the value is zero), for example, if the treading force sum is smaller than the value Fmin corresponding to the target raising force fmin in the first mode, both of the right and left distribution ratios are set to zero. Therefore, in a state immediately before the feet of the user A leave the floor together with the foot sole installation sections 15R and 15L when the user A is to jump or in a state where the user A exists in the air together with the walking assistance device 1 after the feet leave the floor, both of the right and left distribution ratios are set to zero.

Returning to the description of FIG. 10, subsequently, the processing of S307 and S308 related to the right leg link 3R and the processing of S309 and S310 related to the left leg link 3L are performed. In the processing of S307 and S308 related to the right leg link 3R, first in S307, the target total raising force determined in S305 described above is multiplied by the right distribution ratio. This determines the provisional target value Tp_Fankle_R of the total raising force share as a share for the right leg link 3R out of the target total raising force. Then, the provisional target value Tp_Fankle_R is passed through the low-pass filter in S308 to finally determine the control target value T_Fankle_R which is a target value of the total raising force share of the right leg link 3R. The low-pass filter in S308 is provided to remove noise components generated by the fluctuation or the like of the knee angle θ1. The cutoff frequency is, for example, 15 Hz.

Similarly, in the processing of S309 and S310 related to the left leg link 3L, first in S309, the target total raising force determined in S305 described above is multiplied by the left distribution ratio. This determines the provisional target value Tp_Fankle_L of the total raising force share as a share for the left leg link 3L out of the target total raising force. Then, the provisional target value Tp_Fankle_L is passed through the low-pass filter in S310 to finally determine the control target value T_Fankle_L which is a target value of the total raising force share of the left leg link 3L.

If the treading force sum is close to zero and both the left and right distribution ratios are set to zero, both the control target values T_Fankle_R and T_Fankle_L are set to zero.

The processing of S304 whose description is postponed is performed as described below in this embodiment. FIG. 12 is a block diagram showing the flow of estimation processing of the above processing.

In the processing of S304 in this embodiment, the device weight compensation force is estimated by using the measurement value θ1 of the knee angle of each leg link 3 obtained by the knee angle measuring means 61 and the distribution ratios determined in the processing of S306. More specifically, first, the processing of S1001 and the processing of S1002 are performed. In S1001, the measurement value θ1_R of the knee angle of the leg link 3R obtained in the right knee angle measuring means 61R is multiplied by the right distribution ratio determined in S304. Similarly, in S1002, the measurement value θ1_L of the knee angle of the leg link 3L obtained by the left knee angle measuring means 61L is multiplied by the left distribution ratio determined in S304. Thereafter, the values of the results of the operations in S1001 and S1002 are added to each other in S1003. The added result value is obtained as a knee representative angle (this corresponds to a second joint displacement representative value in the present invention). The knee representative angle is, in other words, an arithmetic weighted mean value between the measurement values θ1_R and θ1_L of the knee angles with the right distribution ratio and the left distribution ratio as weighting factors. The knee representative angle obtained as described above has a high correlation with the vertical position (a height position from the floor) of the center-of-gravity of the walking assistance device 1 and eventually with the device weight compensation force.

Therefore, subsequently in S1004, the position (the vertical position) of the center-of-gravity of the walking assistance device 1 (hereinafter, referred to as a device center-of-gravity) is determined on the basis of the knee representative angle in this embodiment. In this instance, for example, the vertical position of the device center-of-gravity (the height of the center-of-gravity from the floor) is obtained according to a preset correlation table (a table showing the correlation between the knee representative angle and the vertical position of the center-of-gravity of the walking assistance device 1), for example, from the knee representative angle. Alternatively, it is also possible to calculate the vertical position of the center-of-gravity of the walking assistance device 1 by geometric calculation, for example, by using a rigid link model composed of two rigid elements connected through joints corresponding to the knee joints (a rigid link model wherein the angle between the two rigid elements matches the knee representative angle and wherein one rigid element has a weight equivalent to the entire weight of the upper side portion of each leg link 3 from the second joint 12 of the walking assistance device 1 and the other rigid element has a weight equivalent to the entire weight of the lower side portion of each leg link 3 from the second joint 12.

Subsequently, the vertical acceleration (motion acceleration) of the device center-of-gravity is calculated by performing the second order differential in S1005 with respect to the position of the device center-of-gravity determined as described above. Thereafter, the sum of the acceleration of the device center-of-gravity and the gravitational acceleration (constant) is calculated in S1006. Moreover, the value of the calculation result in S1006 is multiplied by the device total mass, which is the entire weight of the walking assistance device 1, in S1007. Further, the multiplication result value of S1007 is multiplied by a coefficient Kx of "1" or "0" in S1008, and then the multiplication result value is obtained as an estimated value of the device weight compensation force. In this instance, if the treading force sum is smaller than a predetermined value close to zero, for example, if the treading force sum is smaller than the value Fmin corresponding to the target raising force fmin in the first mode (when the treading force sum<Fmin), Kx is set to zero, and if the treading force sum≧Fmin, Kx is set to 1. Therefore, in a state immediately before the feet of the user A leave the floor together with the foot sole installation sections 15R and 15L when the user A is to jump or in a state where the user A exists in the air together with the walking assistance device 1 after the feet leave the floor (in these states, the actual device weight compensation force is almost zero), the device weight compensation force is set to zero.

As described above, it is possible to easily estimate the device weight compensation force using a simple method by estimating the device weight compensation force.

The above is the details of the processing of the left/right target share determining means 63 including S304. More specifically, the processing of S301 to S303 corresponds to a target acting force setting means in the present invention. Further, the processing of S304 and the processing of S305 correspond to a device weight compensation force estimating means and a target total raising force determining means in the present invention, respectively. Still further, the processing of S306 to S310 corresponds to a distribution means in the present invention.

The processing of the left/right target share determining means 63 described above accordingly causes the control target values T_Fankle_R and T_Fankle_L to be determined in such a way that the raising force obtained by multiplying the target raising force by the right distribution ratio out of the target raising force is borne by the right leg link and the raising force obtained by multiplying the target raising force by the left distribution ratio is borne by the left leg link.

After the processing of the left/right target share determining means 63 is performed as described above, the arithmetic processing section 51 performs the processing of the electric motor control input determining means 64.

FIG. 13 is a block diagram showing the outline of the processing function of the electric motor control input determining means 64. As shown in the figure, the electric motor control input determining means 64 includes a right feedforward control input determining means 64aR, a left feedforward control input determining means 64aL, a right first feedback control input determining means 64bR, a left first feedback control input determining means 64bL, a second feedback control input determining means 64c, and an output control input determining means 64d.

Each feedforward control input determining means 64a receives the inputs of a control target value T_Fankle (the target value of the total raising force share) of the corresponding leg link 3, the measurement value Fankle of the total raising force share of the leg link 3, and the measurement value θ1 of the knee angle of the leg link 3 from the left/right target share determining means 63, each supporting force measuring means 62, and each knee angle measuring means 61, respectively. Thereafter, each feedforward control input determining means 64a determines a feedforward control input Iff, which is a feedforward control input of the current of each electric motor 27 (a feedforward component of an indicator current value) required to cause an actual total raising force share of each leg link 3 to be the control target value T_Fankle of the leg link 3, on the basis of the input values. The details of the processing of the feedforward control input determining means 64a will be described later.

Moreover, each first feedback control input determining means 64b receives the inputs of a control target value T_Fankle (the target value of the total raising force share) of the corresponding leg link 3, the measurement value Fankle of the total raising force share of the leg link 3, and the measurement value θ1 of the knee angle of the leg link 3 from the left/right target share determining means 63, each supporting force measuring means 62, and each knee angle measuring means 61, respectively. Thereafter, the right first feedback control input determining means 64bR determines the first feedback control input Iff1_R of the current of the electric motor 27R (the correction amount of the indicator current value of the electric motor 27R) according to the feedback control law, so that the difference (T_Fankle_R-Fankle_R) between the input control target value T_Fankle_R of the right leg link 3R and the measurement value Fankle_R of the total raising force share converges to zero. Similarly, the left first feedback control input determining means 64bL determines the first feedback control input Iff1_L of the current of the electric motor 27L (the correction amount of the indicator current value of the electric motor 27L) according to the feedback control law, so that the difference (T_Fankle_L-Fankle_L) between the input control target value T_Fankle_L of the left leg link 3L and the measurement value Fankle_L of the total raising force share converges to zero.

In this instance, for example, a proportional-derivative control law (PD control law) is used as the feedback control law of each first feedback control input determining means 64b in this embodiment. As the representative description of the right first feedback control input determining means 64bR, the right first feedback control input determining means 64bR determines the first feedback control input Iff1_R of the electric motor 27R by multiplying each of the difference (T_Fankle_R-Fankle_R) related to the right leg link 3R and the derivative value of the difference by a gain and adding the multiplication result values to each other. In this embodiment, the gain values by which the difference (T_Fankle_R-Fankle_R) and the derivative value thereof are multiplied, respectively (the gain values for the proportional term and the derivative term) are variably set from the measurement value θ1_R (the current value) of the knee angle of the right leg link 3R according to a preset table. The same applies to the left first feedback control input determining means 64bL.

The second feedback control input determining means 64c receives the inputs of the target raising force determined by the left/right target share determining means 63 and the raising force (detected value) indicated by an output of the raising force sensor 90. Thereafter, the second feedback control input determining means 64c determines the second control input Iff2 of the current of the electric motor 27 (one of the electric motors 27) (the correction amount of the indicator current value of the electric motor 27R or 27L) according to the feedback control law, so that the difference between the input target raising force and detected value of the raising force converges to zero.

In this case, for example, a proportional-derivative control law (PD control law) is used as the feedback control law of the second feedback control input determining means 64c in this embodiment. Specifically, the second feedback control input determining means 64c determines the second feedback control input Iff2 by multiplying each of the difference between the target raising force and the detected value of the raising force and the derivative value of the difference by a predetermined gain and adding the multiplication result values to each other.

The output control input determining means 64d determines the indicator current value I_R for the electric motor 27R by adding the first feedback control input Ifb1_R or the second feedback control input Ifb2 to the feedforward control input Iff_R related to the electric motor 27R of the right leg link 3R (correcting Iff_R by Ifb1_R or Ifb2). Moreover, the output control input determining means 64d determines the indicator current value I_L for the electric motor 27L by adding the first feedback control input Ifb1_L or the second feedback control input Ifb2 to the feedforward control input Iff_L related to the electric motor 27L of the left leg link 3L (correcting Iff_L by Ifb1_L or Ifb2). In this case, it depends on the magnitude relation of the control target value of each leg link 3 in this embodiment whether to use the first feedback control input Ifb1 or to use the second feedback control input Ifb2 to determine each of the indicator current values. The details of the processing of the output control input determining means 64d will be described later.

The processing of the electric motor control input determining means 64 having the above means 64aR, 64aL, 64bR, 64bL, 64c, and 64d is performed as described below. First, the electric motor control input determining means 64 performs the processing of the feedforward control input determining means 64aR and 64aL, the first feedback control input determining means 64bR and 64L, and the second feedback control input determining means 64c. In this instance, the processing of the first feedback control input determining means 64bR and 64bL and the processing of the second feedback control input determining means 64c are as described above.

On the other hand, the processing of the feedforward control input determining means 64aR and 64aL is performed as described below.

FIG. 14 is a block diagram showing the processing flow of the feedforward control input determining means 64aR and 64aL. The feedforward control input determining means 64aR and 64L share the same algorithm, and therefore any components related to the left feedforward control input determining means 64aL are shown in parentheses in FIG. 14.

Typically describing the processing of the right feedforward control input determining means 65R, the measurement value θ1_R of the knee angle of the leg link 3R measured by the knee angle measuring means 61R is differentiated in S501. This provides the calculation of an angular velocity ω_R of a bending angle of the second joint 12 of the leg link 3R. Further, in S502, an actual tension T1, which is an actual tension of the wires 32a and 32b of the leg link 3R, is calculated by using the measurement value θ1_R of the knee angle of the leg link 3R and the measurement value Fankle_R of the total raising force share for the leg link 3R measured by the supporting force measuring means 62R. The processing of calculating the actual tension T1 will be described with reference to FIG. 15. In FIG. 15, the leg links 3 are typically shown. Further, in FIG. 15, like elements as those in FIG. 9 are assigned like reference numerals.

First, a component Fankle_a that is orthogonal to the segment S2 of the measurement value Fankle_R of a total raising force share for the leg link 3R is calculated according to the following expression (6).

$$Fankle\_a = Fankle\_R \cdot \sin \theta 2 \quad (6)$$

The angle θ2 is an angle formed by Fankle_R and the segment S2, and the angle θ2 is calculated by geometric calculation using the measurement value θ1_R, as described above with reference to FIG. 9 (see the expressions (2) and (3)).

Then, the Fankle_a determined as described above is multiplied by the length L2 of the segment S2, as shown in the following expression (7). Thereby, a moment M1 generated in the second joint 12 (knee joint) is calculated based on Fankle_R.

$$M1 = Fankle\_a \cdot L2 \quad (7)$$

The moment generated in the pulley 31 by the actual tension T1 of the wires 32a and 32b balances out the moment M1 in s steady state. Further, the moment M1 is divided by an effective radius r of the pulley 31 according to the following expression (8) so as to calculate the actual tension T1 of the wires 32a and 32b.

$$T1 = M1/r \quad (8)$$

The above is the details of the processing in S502.

Returning to the description of FIG. 14, further, a target tension T2 of the wires 32a and 32b of the leg link 3R is calculated in S503. The target tension T2 is a tension to be generated in the wires 32a and 32b on the basis of a control target value (the target value of a total raising force share) of the leg link 3R determined in the processing of the left/right target share determining means 63. The target tension T2 is calculated in the same manner as in the calculation processing in S502. More specifically, a component orthogonal to the segment S2 of the control target value T_Fankle_R (see FIG. 15) is calculated according to an expression in which Fankle_R in the right side of the above expression (6) has been replaced by the control target value T_Fankle_R of the leg link 3R determined in the processing of the left/right target share determining means 63. Then, the calculated component replaces Fankle_a in the right side of the above expression (7), by which a target moment of the second joint 12 of the leg link 3R is calculated. Further, the target moment replaces M1 in the right side of the above expression (8), by which the target tension T2 of the wires 32a and 32b is calculated.

The above is the processing of S503.

After the processing of S501 to S503 is performed as described above, a control input of current of the electric motor 27R Iff_R is determined in S504 by predetermined feedforward processing by using the angular velocity θ1_R of the second joint 12, the actual tension T1 of the wires 32a and 32b, and the target tension T2 calculated as described above. The control input Iff_R means a feedforward component of an indicator current value of the electric motor 27R.

In the processing of S504, the control input Iff_R is calculated according to a model expression represented by the following expression (9).

$$Iff\_R = B1 \cdot T2 + B2 \cdot \omega 1\_R + B3 \cdot sgn(\omega 1\_R) \quad (9)$$

where $B2 = b0 + b1 \cdot T1$, $B3 = d0 + d1 \cdot T1$

In the expression (9), B1 is a constant factor, and B2 and B3 are factors each represented by a linear function of the actual tension T1 as described in the conditional clause of the expression (9). In addition, b0, b1, d0, and d1 are constants. Further, sgn( ) is a sign function.

This expression (9) is a model expression representing the relationship among the current of the electric motor 27, the tension of the wires 32a and 32b, and the angular velocity ω1 of the second joint 12. More specifically, a first term of the right side of the expression (9) means the proportional term of tension, a second term means the term based on the viscous frictional force between the wires 32a, 32b, and the pulley 31, and a third term means a term based on a dynamic frictional force between the wires 32a, 32b and the pulley 31. A term based on angular acceleration of the second joint 12 (in other words, a term based on an inertial force) may be further added to the right side of the expression (9).

Supplementarily, the constants B1, b0, b1, d0, and d1 used for the calculation of the expression (9) are experimentally identified by an identification algorithm that minimizes the square value of the difference between a value of the left side and a value of the right side of the expression (9) beforehand. Then, the identified constants B1, b0, b1, d0, and d1 are stored in a memory, which is not shown, and used when the walking assistance device 1 is operated.

The above is the processing of the right feedforward control input determining means 65R. The same applies to the processing of the left feedforward control input determining means 65L.

After performing the processing of the feedforward control input determining means 64aR and 64aL, the first feedback control input determining means 64bR and 64bL, and the second feedback control input determining means 64c as described above, the electric motor control input determining means 64 performs the processing of the output control input determining means 64d.

FIG. 16 is a flowchart showing the processing of the output control input determining means 64d. As shown in the figure, first, the output control input determining means 64d determines whether the target total raising force share T_Fankle_R of the right leg link 3R determined by the left/right target share determining means 63 is greater than the target total raising force share T_Fankle_L of the left leg link 3L at the current control processing cycles (S601) If T_Fankle_R>T_Fankle_L (if the determination result of S601 is YES) in the above, the output control input determining means 64d sets the indicator current value I_R of the electric motor 27R corresponding to the right leg link 3R to a value obtained by adding the second feedback control input Ifb2 determined by the second feedback control input determining means 64c to the feedforward control input Iff_R determined by the right feedforward control input determining means 64aR (a value obtained by correcting Iff_R by Ifb2) in S602. Further, the output control input determining means 64d sets the indicator current value I_L of the electric motor 27L corresponding to the left leg link 3L to a value obtained by adding the first feedback control input Ifb1_L determined by the first feedback control input determining means 64bL to the feedforward control input Iff_L determined by the left feedforward control input determining means 64aL (a value obtained by correcting Iff_L by Ifb1_L).

If T_Fankle_R>T_Fankle_L, the feedforward control input Iff_R and the second feedback control input Ifb2 correspond to a first control input and a second control input in the present invention, respectively, with respect to the electric motor 27R. As to the electric motor 27L, the value obtained by correcting the feedforward control input Iff_L by the first feedback control input Ifb1_L (=Iff_L+Ifb1_L) corresponds to a first control input in the present invention.

Further, if T_Fankle_R≦T_Fankle_L in S601 (if the determination result of S601 is NO), the output control input determining means 64d sets the indicator current value I_R of the electric motor 27R corresponding to the right leg link 3R to a value obtained by adding the first feedback control input Ifb1_R determined by the right first feedback control input determining means 64bR to the feedforward control input Iff_R determined by the right feedforward control input determining means 64aR in S603. Further, the output control input determining means 64d sets the indicator current value I_L of the electric motor 27L corresponding to the left leg link 3L to a value obtained by adding the second feedback control input Ifb2 determined by the second feedback control input determining means 64c to the feedforward control input Iff_L determined by the left feedforward control input determining means 64aL.

If T_Fankle_R≦T_Fankle_L, the feedforward control input Iff_L and the second feedback control input Ifb2 correspond to the first control input and the second control input in the present invention, respectively, with respect to the electric motor 27L. As to the electric motor 27R, the value obtained by correcting the feedforward control input Iff_R by the first feedback control input Ifb1_R (=Iff_R+Ifb1_L) corresponds to the first control input in the present invention.

As described above, the indicator current values I_R and I_L of the electric motors 27R and 27L are determined to be indicator current values obtained by correcting the feedforward control input Iff corresponding to the leg link 3 by the second feedback control input Ifb2 depending on a difference between the target raising force and the detected value of the raising force, with respect to the electric motor 27 corresponding to the leg link 3 having a greater target total raising force share T_Fankle. More specifically, the indicator current values are determined so as to approximate the raising force (detected value) indicated by the output of the raising force sensor 90 to the target raising force. Moreover, with respect to the electric motor 27 corresponding to the other leg link 3, the indicator current values I_R and I_L are determined to be indicator current values obtained by correcting the feedforward control input Iff corresponding to the leg link 3 by the first feedback control input Ifb1 depending on a difference between the control target value T_Fankle (the target value of the total raising force share) and the measurement value Fankle of the total raising force. More specifically, the indicator current values are determined so as to approximate the measurement value Fankle of the total raising force share determined by the supporting force measuring means 62 from the output of the supporting force sensor 30 to the control target value T_Fankle.

The above is the processing of the output control input determining means 64d. The arithmetic processing section 51 outputs the indicator current values I_R and I_L determined by the output control input determining means 64d as described above to the driver circuits 52 corresponding to the respective electric motors 27. At this time, the driver circuits 52 apply power to the electric motors 27 according to the given indicator current values.

Supplementarily describing, the control target value of each leg link 3 is determined as described above and therefore is proportional to the measurement value FRF of the treading force of the leg of the user A corresponding to the leg link 3. Accordingly, the magnitude relation between the control target value T_Fankle_R of the right leg link 3R and the control target value T_Fankle_L of the left leg link 3L matches the magnitude relation between the measurement value FRF_R of the treading force of the right leg of the user A and the measurement value FRF_L of the treading force of the left leg. For this reason, switching the processing of S602 and S603 in FIG. 16 according to the magnitude relation between the control target values T_Fankle_R and T_Fankle_L (switching the way of determining the indicator current values I_R and I_L) by the output control input determining means 64d is equivalent to switching the processing according to the magnitude relation between the measurement values FRF_R and FRF_L of the treading forces. In other words, determining whether the relation T_Fankle_R>T_Fankle_L is satisfied in S601 of FIG. 16 is equivalent to determining whether the relation FRF_R>FRF_L is satisfied.

Alternatively, in the determination processing in S601, it is possible to determine the magnitude relation between the measurement values Fankle_R and Fankle_L of the total raising force share of the leg links 3 obtained through the supporting force sensor 30 (to determine whether Fankle_R>Fankle_L is satisfied), instead of determining the magnitude relation between T_Fankle_R and T_Fankle_L (or the magnitude relation between FRF_R and FRF_L), in the determination processing of S601.

Although the indicator current values I_R and I_L of the electric motors 27R and 27L have been determined by the processing of S604 in FIG. 16 if T_Fankle_R equals T_Fankle_L (or if FRF_R equals FRF_L or Fankle_R equals Fankle_L) in this embodiment, alternatively it is possible to determine the indicator current values I_R and I_L by the processing of S602, instead of the processing of S603. Moreover, if T_Fankle_R>T_Fankle_L (or if FRF_R>FRF_L or if Fankle_R>Fankle_L), then the first feedback control input Ifb1_R related to the electric motor 27R is not used, and therefore it is possible to omit the processing of the right first feedback control input determining means 64bR. Similarly, if T_Fankle<T_Fankle_L (or if FRF_R<FRF_L or if Fankle_R<Fankle_L), the first feedback control input Ifb1_L related to the electric motor 27L is not used, and therefore it is possible to omit the processing of the left first feedback control input determining means 64bL.

The control processing of the arithmetic processing section 51 described above is performed at predetermined control processing cycles. Thus, the torque to be generated in each electric motor 27 and eventually the driving force of the second joint 12 (the knee joint) of the leg link 3 are controlled so that the upward raising force actually acting on the user A from the seating section 2 agrees with the target raising force.

In this case, for the leg link 3 corresponding to the leg having a greater measurement value FRF of the treading force of the user A, the torque to be generated in the electric motor 27 corresponding to the leg link 3 is controlled so that the raising force (detected value) detected via the raising force sensor 90 becomes closer to the target raising force. Further, for the other leg link 3, the torque to be generated in the electric motor 27 corresponding to the leg link 3 is controlled so that the total raising force share obtained via the supporting force sensor 30 becomes closer to the control target value (the target value of the total raising force share). This allows the torque generated in each electric motor 27 to be controlled so that the target raising force reliably acts on the user A from the seating section 2 while preventing the interference between the feedback control for approximating the detected value of the raising force to the target raising force and the feedback control for approximating the measured value of the total raising force share to the control target value.

Moreover, the target raising force is set to a positive value equal to or greater than the lower limit Fmin even if the treading force sum is close to zero, as well as if the treading force sum is large enough. Therefore, not only when the user A is to walk normally or the user is standing (in these cases, the treading force sum is relatively large), but also in a state just before the feet of the user A leave the floor together with the foot sole installation sections 15R and 15L when the user A is to jump or in a state where the user A exists in the air together with the walking assistance device 1 after the feet leave the floor, the walking assistance device 1 is capable of generating a force of pressing the seating section 2 against the user A. As a result, it is possible to prevent a situation where the seating section 2 is away from the user A.

Moreover, the sum of the control target values T_Fankle_R and T_Fankle_L corresponding to the left and right leg links 3R and 3L agrees with the target total raising force (except when the treading force sum is close to zero). Moreover, the target total raising force is a force obtained by adding the device weight compensation force to the target raising force. Therefore, the torques to be generated in the electric motors 27R and 27L are controlled so that the total sum of the supporting forces acting on the leg links 3R and 3L from the floor side (nearly equal to the total sum of the leg link supporting forces) agrees with the target total raising force.

As a result, in a state where the treading force sum is relatively large and one of the foot sole installation sections 15 of the walking assistance device 1 lands, it is possible to appropriately control the raising force actually acting on the user A from the seating section 2 to the target raising force with the supporting force against the sum of the gravity acting on the walking assistance device 1 and the inertial force (vertical inertial force) generated in the walking assistance device 1 being borne by the walking assistance device 1. In other words, it is possible to cause the target raising force to act on the user A from the seating section 2 by appropriately compensating for the effect of the inertial force generated in the walking assistance device 1 and of the gravity acting on the walking assistance device 1.

Moreover, the control target value T_Fankle as a share for each leg link 3 of the target total raising force is determined according to the ratio of the measurement values FRF_R and FRF_L of the treading forces so that a ratio between the right control target value T_Fankle_R and the left control target value T_Fankle_L agrees with a ratio between the measurement value FRF_R of the treading force of the right leg of the user A and the measurement value FRF_L of the treading force of the left leg of the user A. Therefore, it is possible to set the share for each leg link 3 of the target total raising force in conformity with the motion of the leg intended by the user A. This consequently allows the raising force to act on the user A from the seating section 2 smoothly and stably.

Furthermore, it is possible to change the way of determining the target raising force by changing the mode with the assist ratio and mode setting key switch 53. This enables the setting of the target raising force appropriate for the motion pattern desired by the user A.

Subsequently, a second embodiment of the present invention will be described. This embodiment differs from the first embodiment only in a part of the configuration and processing. Therefore, the description will focus on the differences, and the description of the same configurations and processing portions as those of the first embodiment will be omitted.

Referring to FIG. 1, in this embodiment walking assistance device 1 includes the acceleration sensor 80 attached to the seating section frame 2a, and an output from the acceleration sensor 80 (an acceleration detected value) is entered into the arithmetic processing section 51 as indicated by the dotted arrow in FIG. 4. The acceleration sensor 80 is capable of detecting a vertical acceleration and the acceleration detected value includes a gravitational acceleration component.

The acceleration detected value entered into the arithmetic processing section 51 from the acceleration sensor 80 is used in the processing of the left/right target share determining means 63 (see the dotted arrow in FIG. 5). More specifically, in this embodiment the acceleration detected value (a vertical acceleration detected value) of the acceleration sensor 80 is used to estimate the device weight compensation force in S304 of FIG. 10.

Referring to FIG. 17, there is shown a block diagram illustrating the estimated processing flow of the device weight compensation force in this embodiment. In the estimation processing, the measurement value θ1 of the knee angle of each leg link 3 obtained by each knee angle measuring means 61 is used together with the acceleration detected value of the acceleration sensor 80. The estimation processing will be briefly described. The walking assistance device 1 is treated as a collection of a portion composed of the seating section 2, the seating section frame 2a, and members secured thereto (hereinafter, referred to as the device base), a portion including the right leg link 3R and movable so as to be relatively integral with the right leg link 3R to the seating section frame 2a (hereinafter, referred to as the device right leg portion), and a portion including the left leg link 3L and movable so as to be relatively integral with the left leg link 3L to the seating section 2 (hereinafter, referred to as the device left leg portion). In the walking assistance device 1 having the structure shown in FIG. 1, the device right leg portion includes the electric motor 27R and the foot sole installation section 15R and the device left leg portion includes the electric motor 27L and the foot sole installation section 15L. If the electric motors 27R and 27L are secured to the seating section 2, the electric motors 27R and 27L are included in the device base. Hereinafter, the device base, the device right leg portion, and the device left leg portion will be sometimes generically referred to as the device components, respectively.

Then, an actual vertical acceleration (including the gravitational acceleration component) is detected or estimated, with respect to the center-of-gravity of each device component. Further, the supporting force against the sum of the gravity acting on the device component and the vertical inertial force generated in the device component is estimated by multiplying the vertical acceleration (absolute acceleration) of the device component by the weight of the device component. This supporting force means a component caused by the weight of the device component of the device weight compensation force and hereinafter will be referred to as the device partial weight compensation force. Furthermore, the estimated values of the device partial weight compensation forces of all device components are added to calculate the estimated value of the device weight compensation force.

Hereinafter, the estimation processing will be specifically described with reference to FIG. 17.

First, the processing of S2001 and S2002 for obtaining (estimating) the vertical relative acceleration to the seating section frame 2a of the center-of-gravity of the device right leg portion and the processing of S2003 and S2004 for obtaining (estimating) the vertical relative acceleration to the seating section frame 2a of the center-of-gravity of the device left leg portion are performed sequentially or concurrently.

More specifically, in S2001, the relative position (the vertical relative position) of the center-of-gravity of the device right leg portion to the seating section frame 2a is obtained from the measurement value θ1_R of the knee angle of the leg link 3R determined by the right knee angle measuring means 61R. In this case, for example, correlation data is previously set which represents the correlation between the relative position (the vertical relative position) of the center-of-gravity of the device right leg portion to the seating section frame 2*a* in a state where the lower end (the foot sole installation section 15R) of the leg link 3R is located directly below the seating section 2 and the knee angle of the leg link 3R, and then the setting is stored in a memory which is not shown. Then, in S2001, the relative position (the vertical relative position) of the center-of-gravity of the device right leg portion to the seating section frame 2*a* is obtained on the basis of the correlation data from the measurement value θ1_R.

The second order differential is performed in S2002 for the time series of the relative position of the center-of-gravity of the device right leg portion obtained as described above to estimate the vertical relative acceleration to the seating section frame 2*a* of the center-of-gravity of the device right leg portion.

Similarly, in S2003, the relative position (the vertical relative position) of the center-of-gravity of the device left leg portion to the seating section frame 2*a* is obtained from the measurement value θ1_L of the knee angle of the leg link 3L determined by the left knee angle measuring means 61L, on the basis of the preset correlation data (which represents the correlation between the relative position [the vertical relative position] of the center-of-gravity of the device left leg portion to the seating section frame 2*a* in a state where the lower end [the foot sole installation section 15L] of the leg link 3L is located directly below the seating section 2 and the knee angle of the leg link 3L). Thereafter, the second order differential is performed in S2004 for the time series of the relative position of the center-of-gravity of the device left leg portion obtained as described above to estimate the vertical relative acceleration to the seating section frame 2*a* of the center-of-gravity of the device left leg portion.

Subsequently, the processing of S2005 and S2006 is performed. In S2005, the acceleration detected value of the acceleration sensor 80 is added to the relative acceleration of the device right leg portion obtained in S2002 to thereby obtain the vertical acceleration (absolute acceleration) of the device right leg portion. Similarly, in S2006, the acceleration detected value of the acceleration sensor 80 is added to the relative acceleration of the device left leg portion obtained in S2002 to thereby estimate the vertical acceleration (absolute acceleration) of the device left leg portion.

The acceleration sensor 80 is attached to the seating section frame 2*a*, and therefore the acceleration detected value of the acceleration sensor 80 means the detected value of the absolute acceleration (vertical absolute acceleration) of the center-of-gravity of the device base.

Subsequently, the processing of S2007, S2008, S2009, and S2010 is performed.

In S2007, the acceleration detected value of the acceleration sensor 80, namely the detected value of the vertical acceleration of the device base is multiplied by the weight of the device base. Thereby, the device partial weight compensation force of the device base is obtained. Moreover, in S2008, the estimated value of the vertical acceleration of the device right leg portion obtained in S2005 is multiplied by the weight of the device right leg portion. Thereby, the device partial weight compensation force of the device right leg portion is obtained. Further, in S2009, the estimated value of the vertical acceleration of the device left leg portion obtained in S2006 is multiplied by the weight of the device left leg portion. Thereby, the device partial weight compensation force of the device left leg portion is obtained.

Thereafter, in S2010, the device partial weight compensation forces of the device base, the device right leg portion, and the device left leg portion obtained as described above are added to each other. Thereby, the estimated value of the device weight compensation force is obtained.

The configurations and processing other than those described above are the same as in the first embodiment.

Also in this embodiment, it is possible to generate the same effects as in the first embodiment. Moreover, particularly when the device weight compensation force is estimated, it is possible to estimate the device weight compensation force more accurately by using the acceleration detected value detected by the acceleration sensor 80, in addition to the measurement value θ1 of the knee angle of each leg link 3. This thereby enables more accurate control of the raising force to the target raising force.

In the embodiments described hereinabove, the first feedback control input Ifb1 has been used to cause the difference between the control target value T_Fankle of each leg link 3 and the measurement value Fankle of the total raising force share of the leg link 3 to converge to zero. Alternatively, however, it is possible to determine the indicator current value which is the control input of each electric motor 27, without using the first feedback control input Ifb1. For example, if T_Fankle_R>T_Fankle_L (or if FRF_R>FRF_L or Fankle_R>Fankle_L), the indicator current value I_R of the electric motor 3R is set to a value obtained by correcting the right feedforward control input Iff_R by the second feedback control input Ifb2 (=Iff_R+Ifb2), and the indicator current value I_L of the electric motor 3L is set to the value of the left feedforward control input Iff_L. Then, if T_Fankle_R≦T_Fankle_L (or if FRF_R≦FRF_L or Fankle_R≦Fankle_L), the indicator current value I_L of the electric motor 3L is set to a value obtained by correcting the left feedforward control input Iff_L by the second feedback control input Ifb2 (=Iff_L+Ifb2), and the indicator current value I_R of the electric motor 3R is set to the value of the right feedforward control input Iff_R. In this instance, the first feedback control input determining means 64*b* is unnecessary. Then, in this case, the feedforward control inputs Iff_R and Iff_L correspond to first control inputs in the present invention, the second feedback control input Ifb2 corresponds to a second control input in the present invention.

Moreover, in the above case, alternatively, for example, it is possible to determine the indicator current value obtained by correcting the right feedforward control input Iff_R as the control input of the electric motor 27R and to determine the indicator current value obtained by correcting the left feedforward control input Iff_L by a value obtained by multiplying the second feedback control input Ifb2 by the left distribution ratio as the control input of the electric motor 27L.

Furthermore, although each leg link 3 includes the first to third joints 10, 12, and 14 in the above embodiments, the leg link 3 may include more joints. In that case, however, a joint is needed to connect the leg link to the seating section and actuators are needed to drive joints other than the joint for connecting the leg link to the foot sole installation section.

Moreover, although the supporting force share for each leg link has been measured by using the supporting force sensor 30, it is also possible to estimate the supporting force share by using a dynamic model of the walking assistance device 1.

Industrial Applicability

As described hereinabove, the present invention is useful to provide a walking assistance device capable of appropriately assisting a user in walking.

BRIEF DESCRIPTION OF THE DRAWINGS

FIG. 10 is a block diagram illustrating a processing flow of a left/right target share determining means 63.

Figure 1:
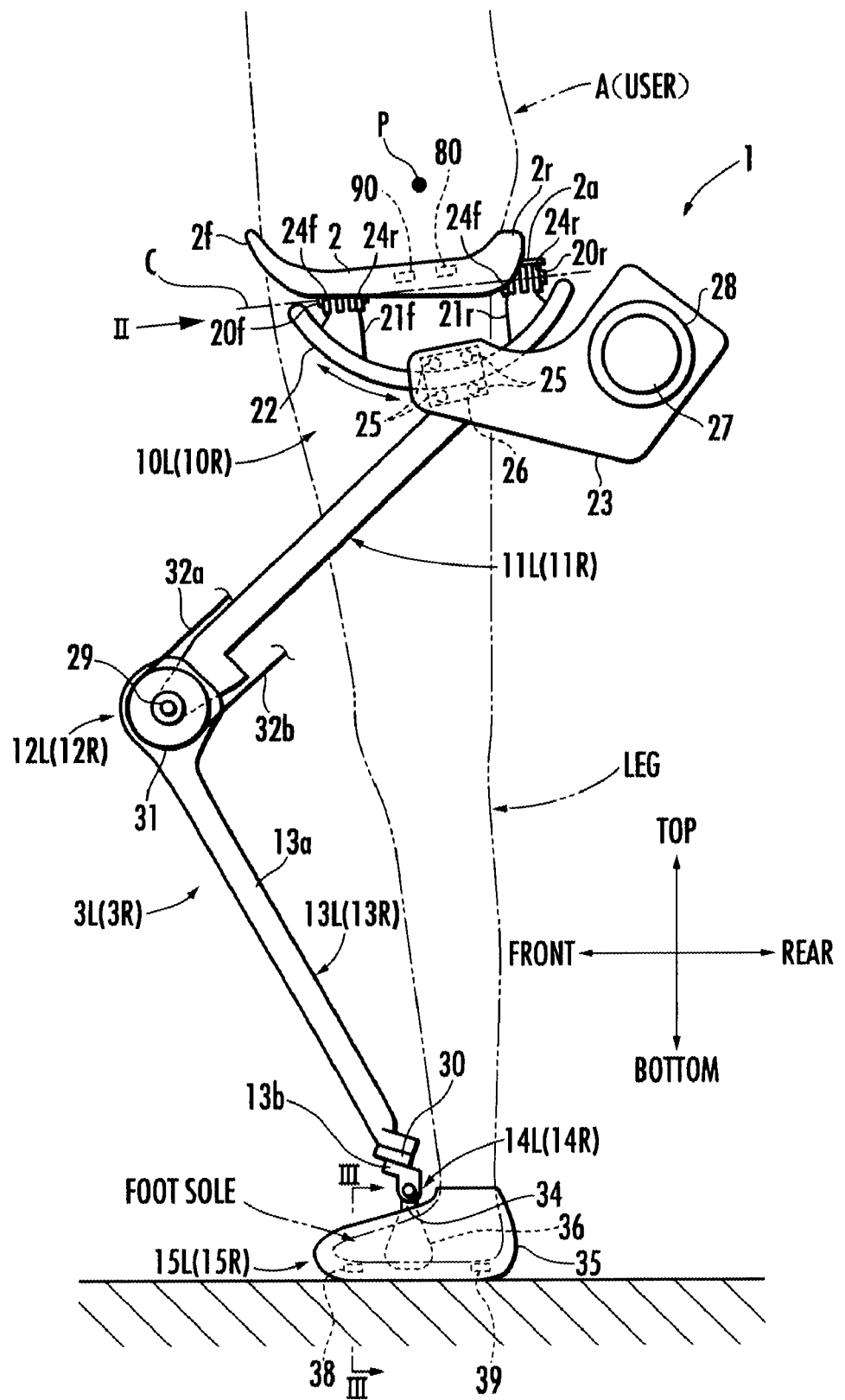
FIG. 1 is a side view of a walking assistance device 1 according to a first embodiment of the present invention.
Figure 2:
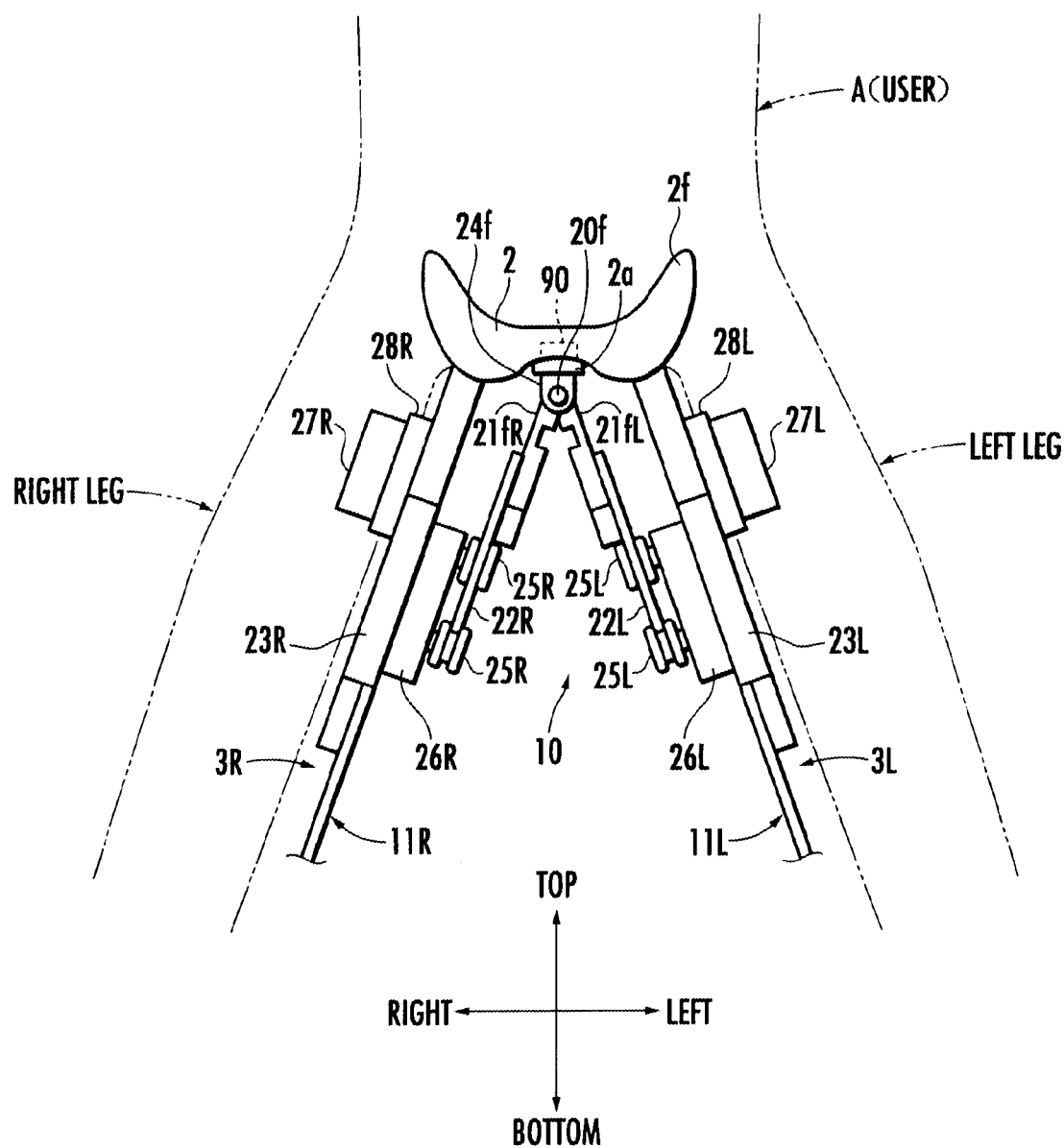
FIG. 2 is a view on arrow taken along line II in FIG. 1.
Figure 3:
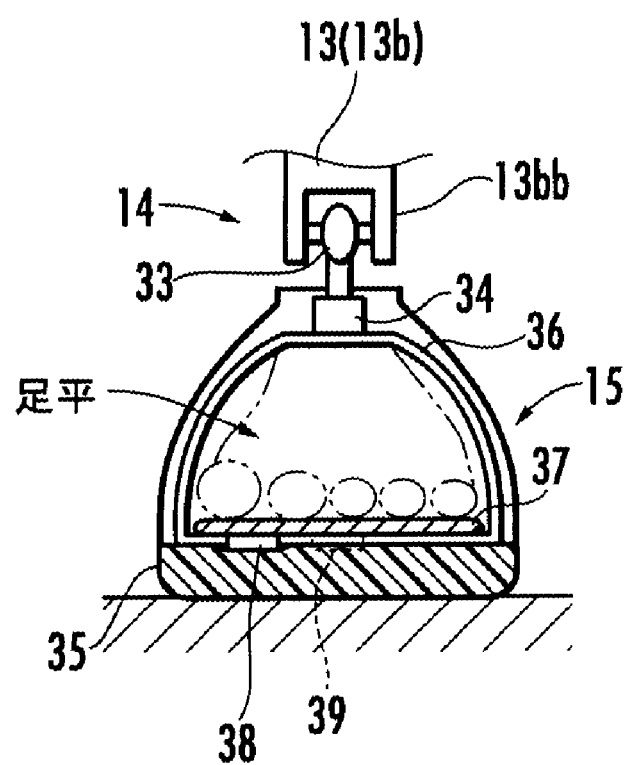
FIG. 3 is a sectional view taken along line III-III in FIG. 1.
Figure 4:
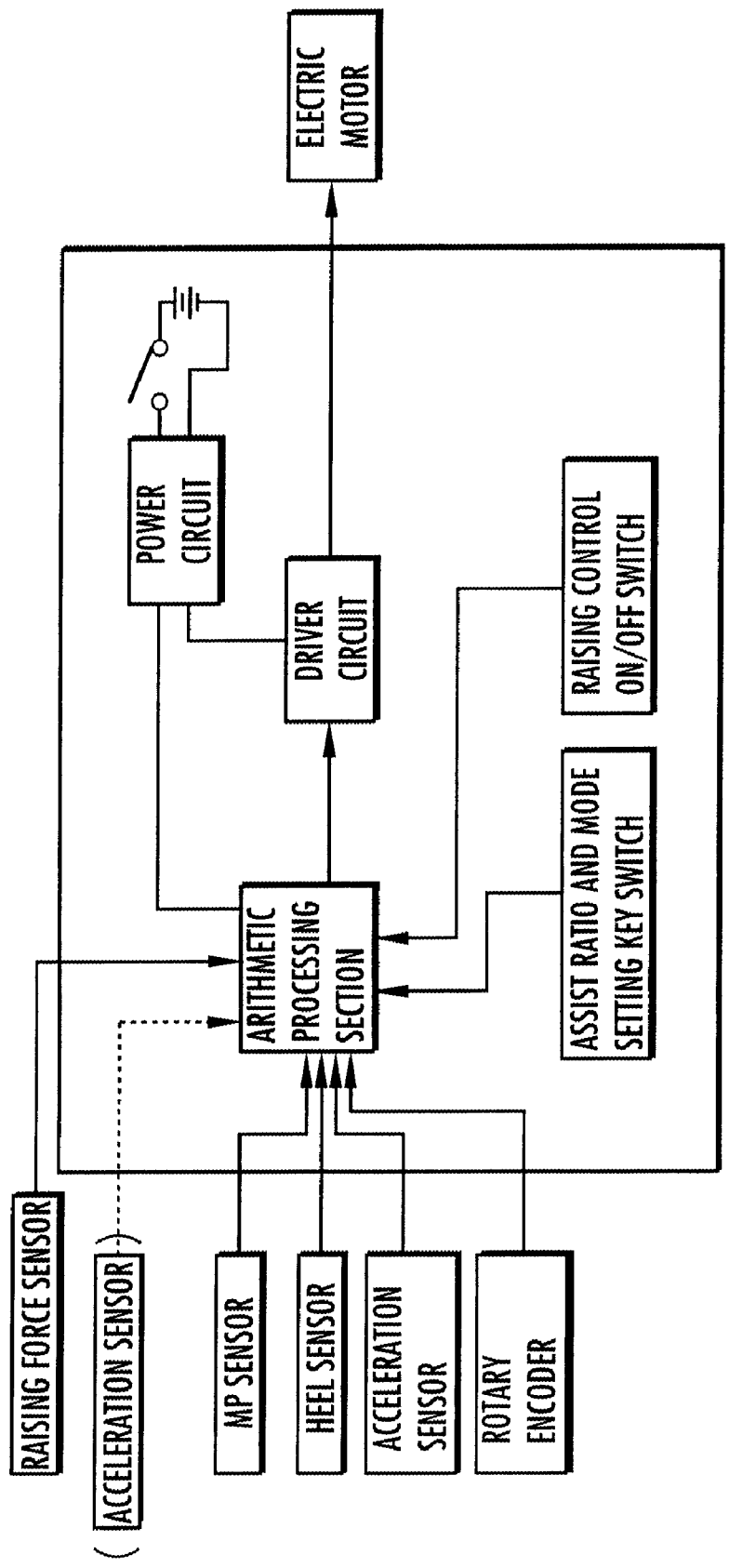
FIG. 4 is a block diagram schematically illustrating a configuration (hardware configuration) of a control device for the walking assistance device in FIG. 1.
Figure 5:
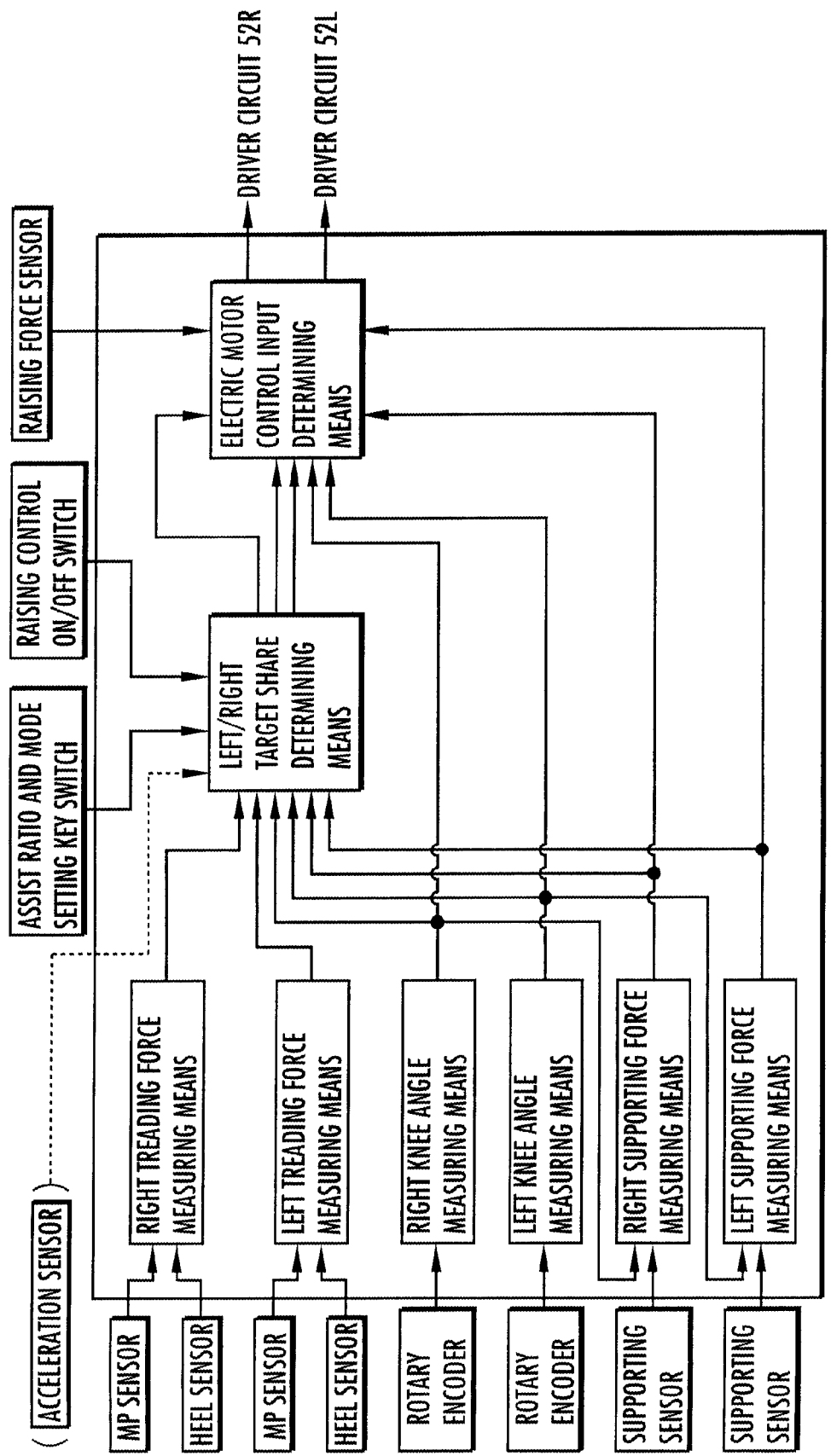
FIG. 5 is a block diagram illustrating a functional configuration of an arithmetic processing section 51 provided in the control device in FIG. 4.
Figure 6:
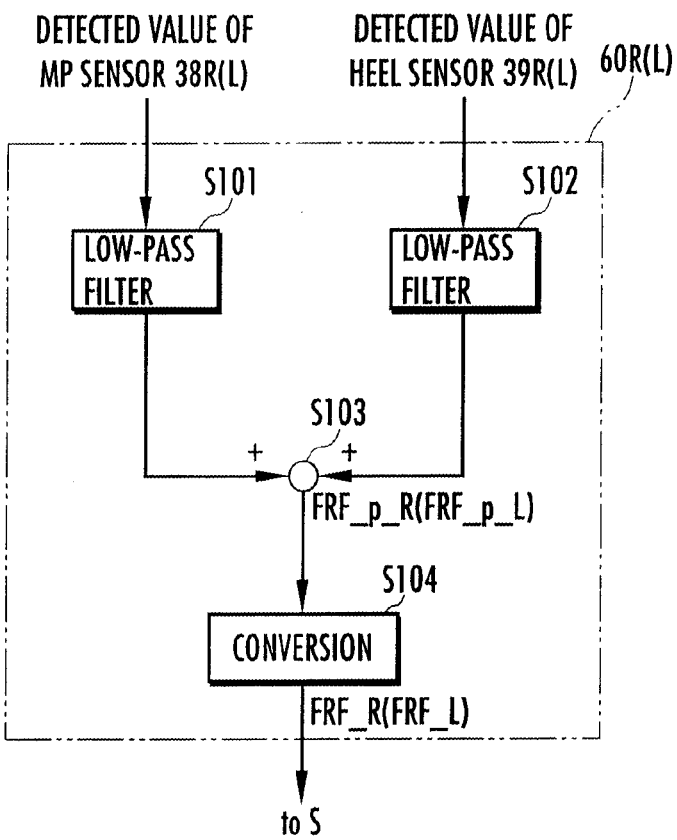
FIG. 6 is a block diagram illustrating a processing flow of a treading force measuring means 60R, 60L.
Figure 7:
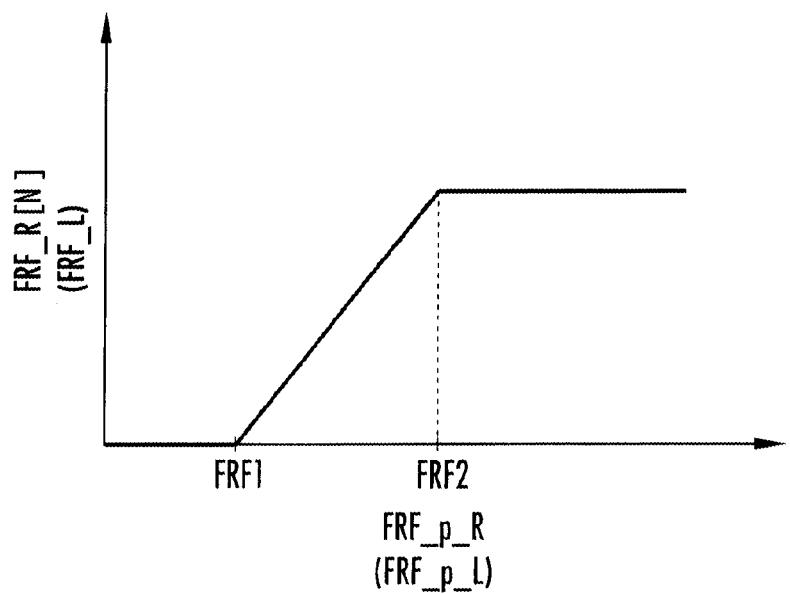
FIG. 7 is a graph illustrating a table used in processing of S104 in FIG. 6.
Figure 8:
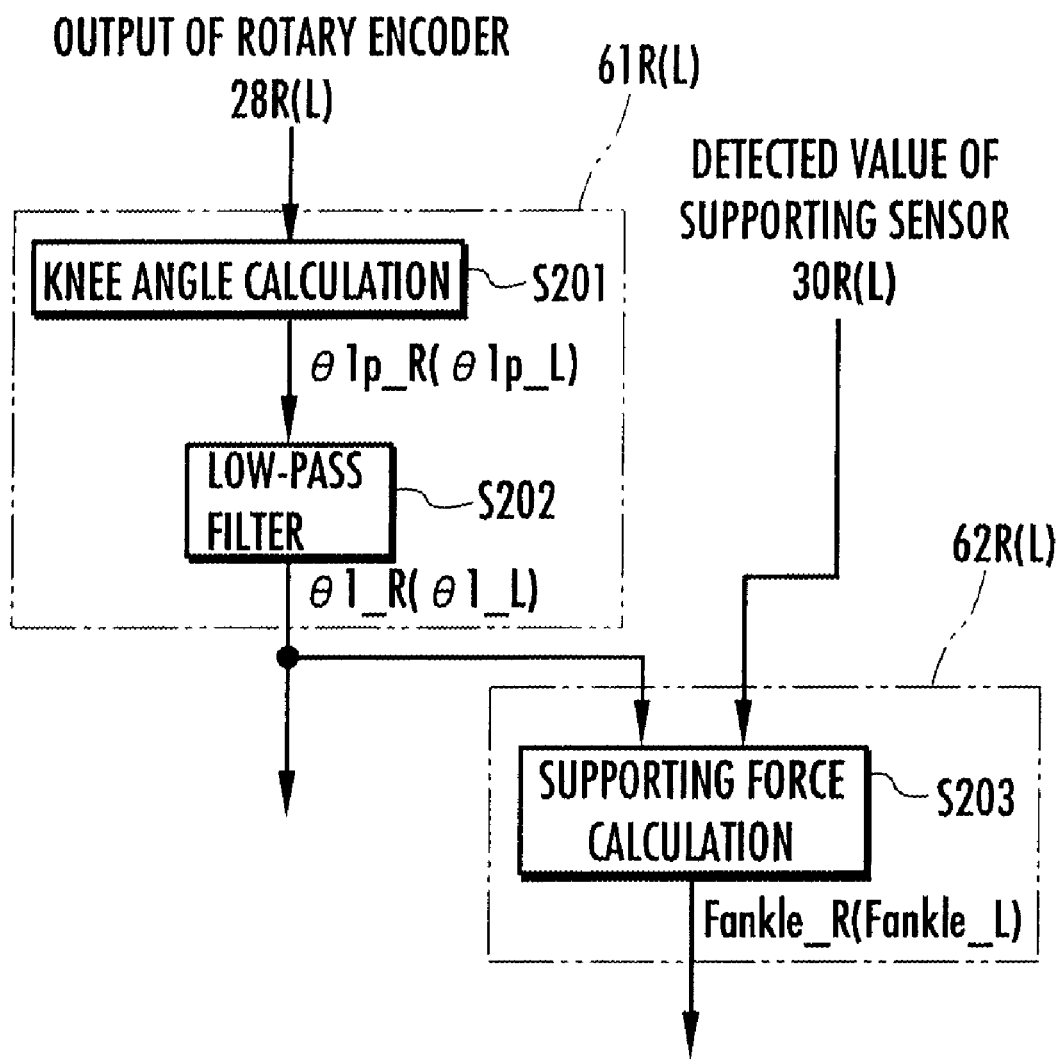
FIG. 8 is a block diagram illustrating a processing flow of a knee angle measuring means 61R, 61L.
Figure 9:
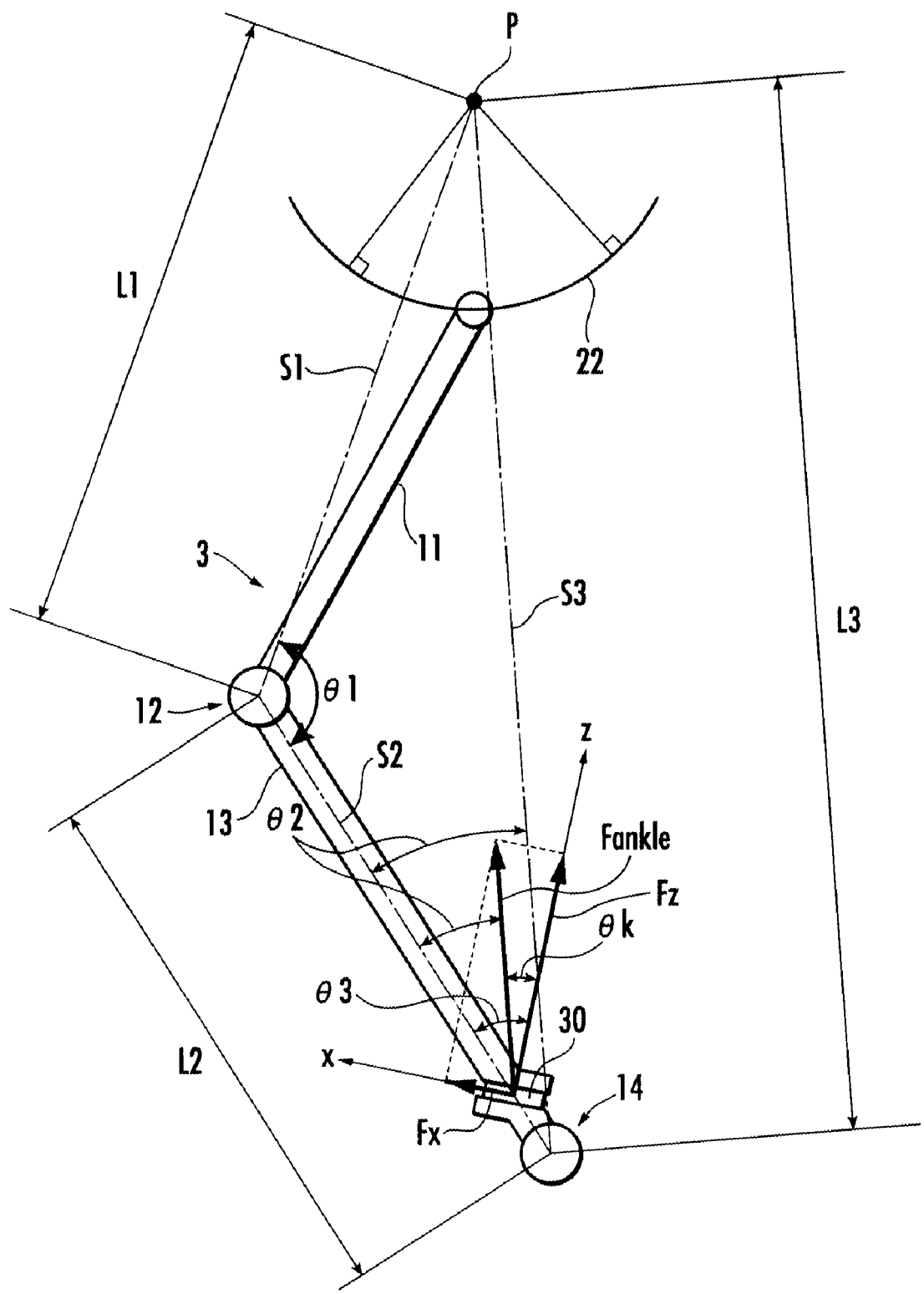
FIG. 9 is a diagram for explaining the processing of S201 and S203 in FIG. 8.
Figure 11A:
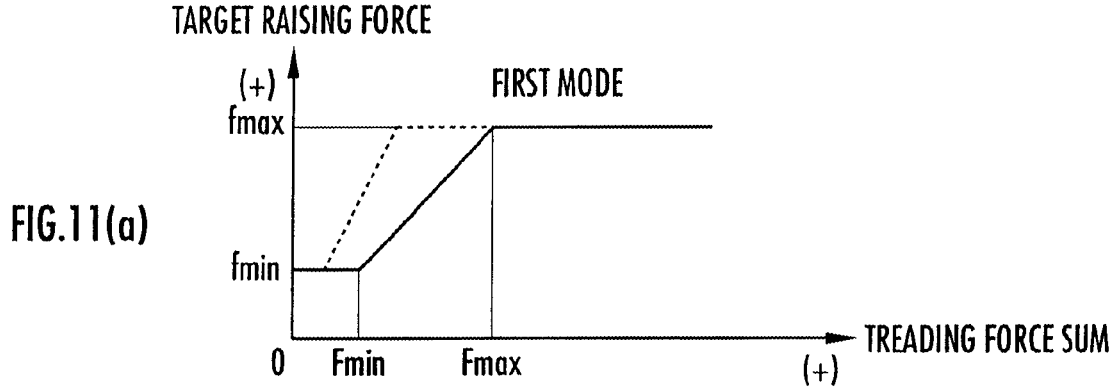
FIG. 11(a) and FIG. 11(b) are graphs for explaining the processing of S303 in FIG. 10.
Figure 11B:
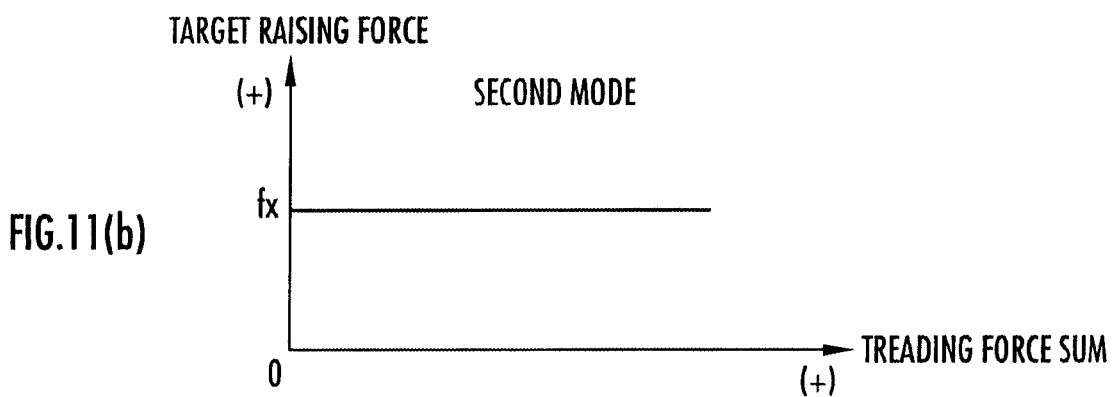
Figure 12:
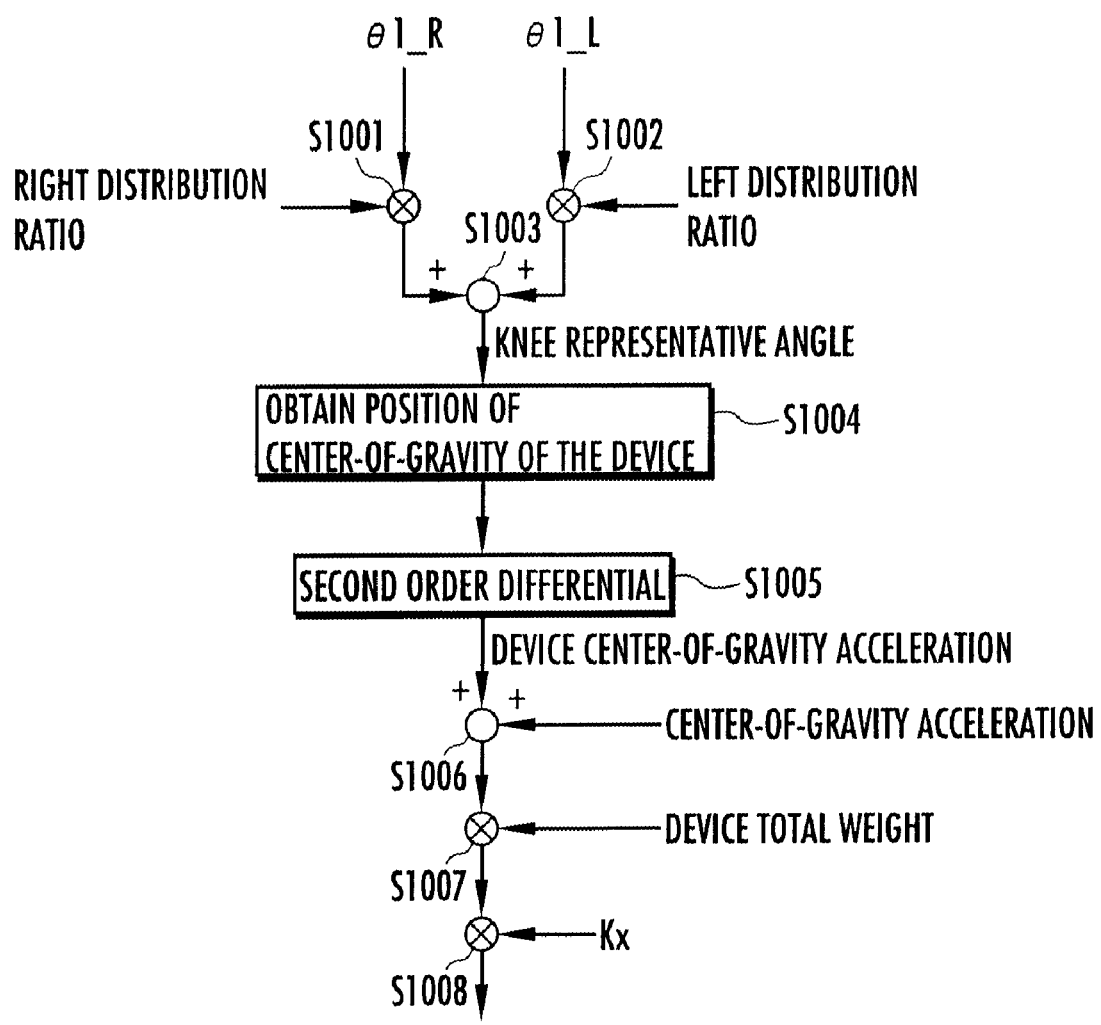
FIG. 12 is a block diagram illustrating a processing flow of S304 in FIG. 10.
Figure 13:
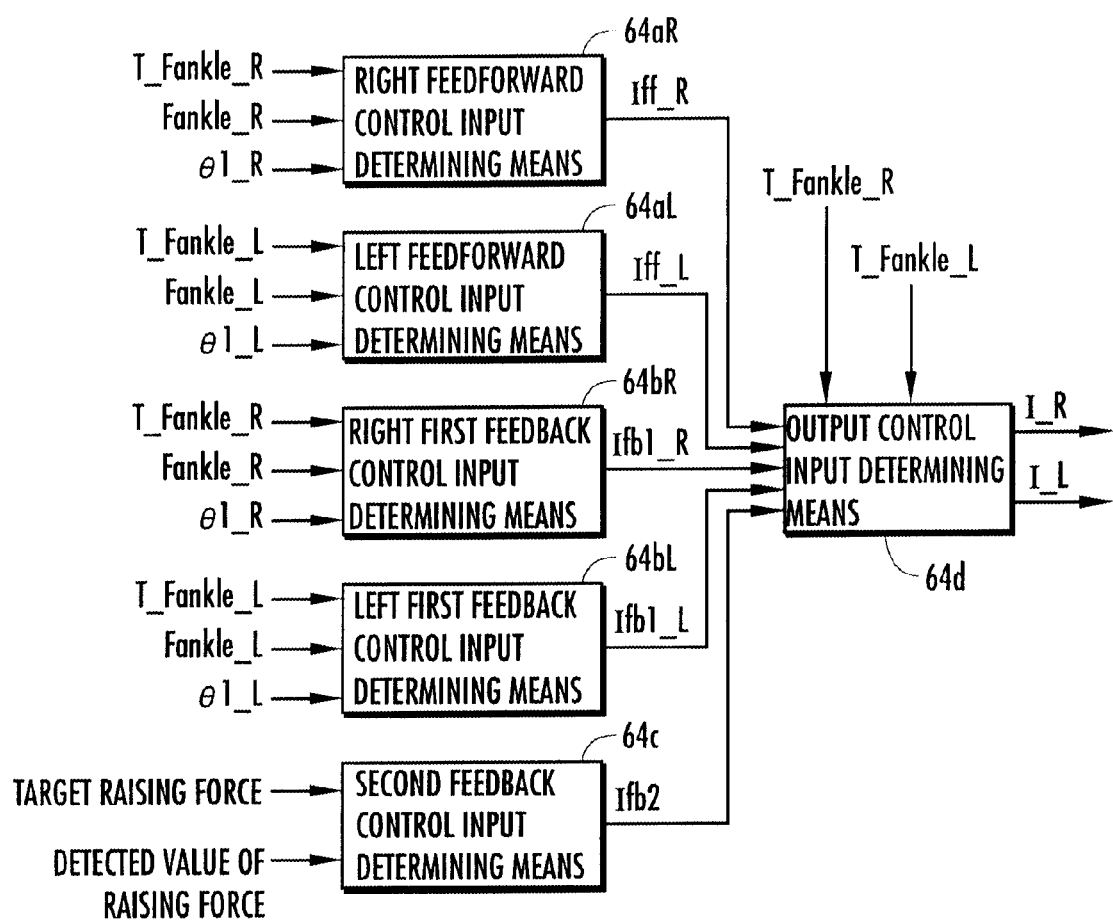
FIG. 13 is a block diagram illustrating a function of an electric motor control input determining means shown in FIG. 5.
Figure 14:
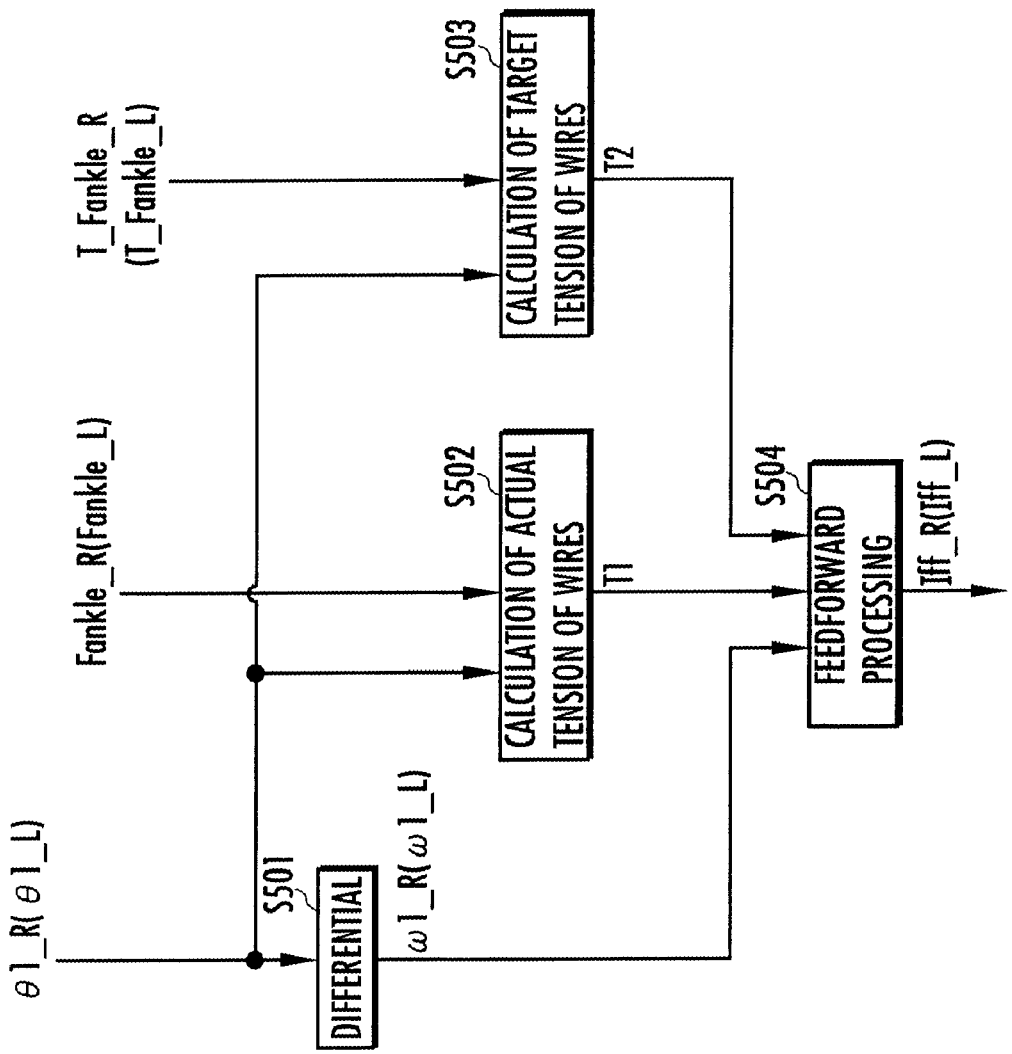
FIG. 14 is a block diagram illustrating a processing flow of feedforward control input determining means 64aR and 64aL shown in FIG. 13.
Figure 15:
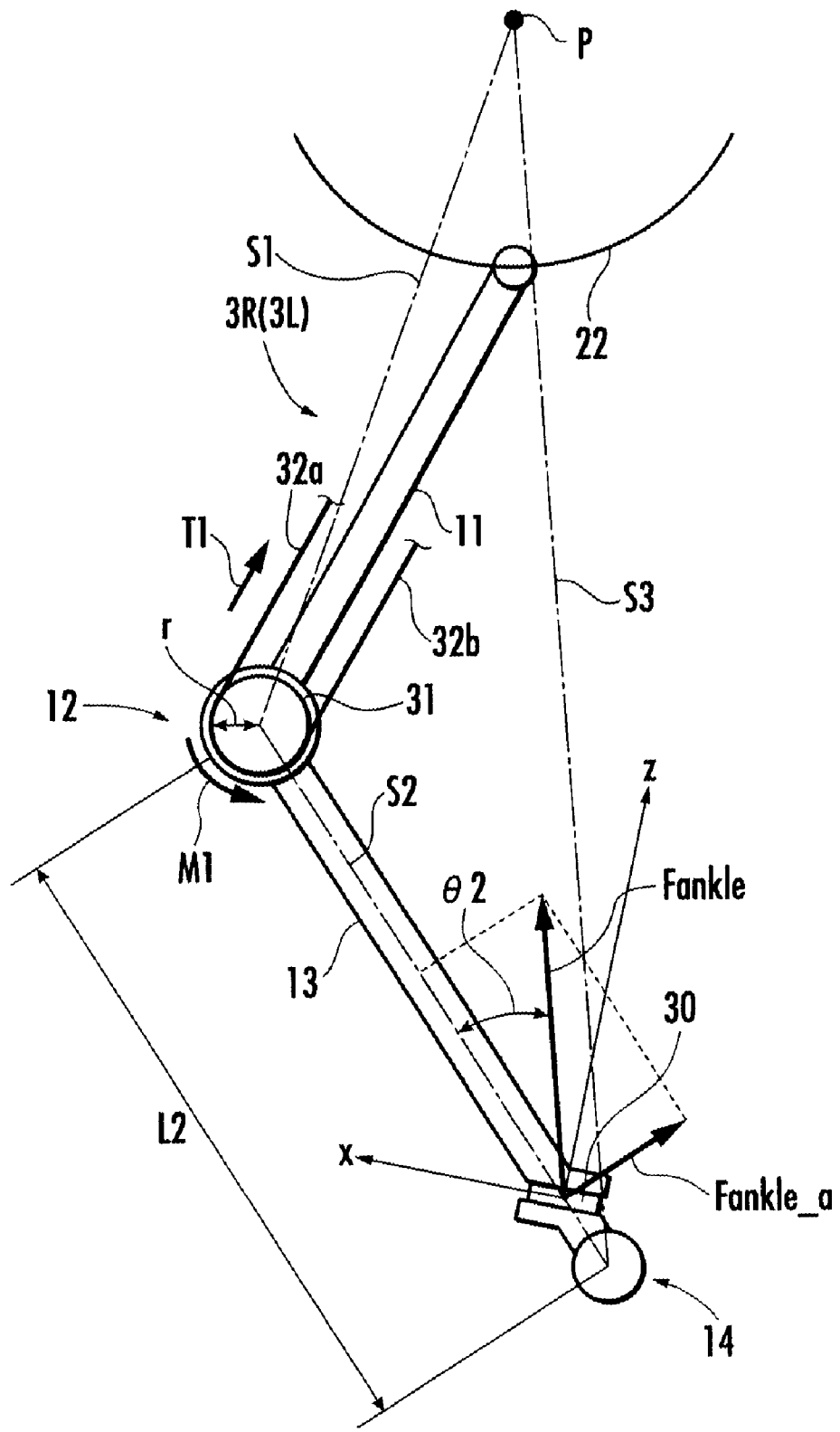
FIG. 15 is a diagram for explaining the processing of S502 in FIG. 14.
Figure 16:
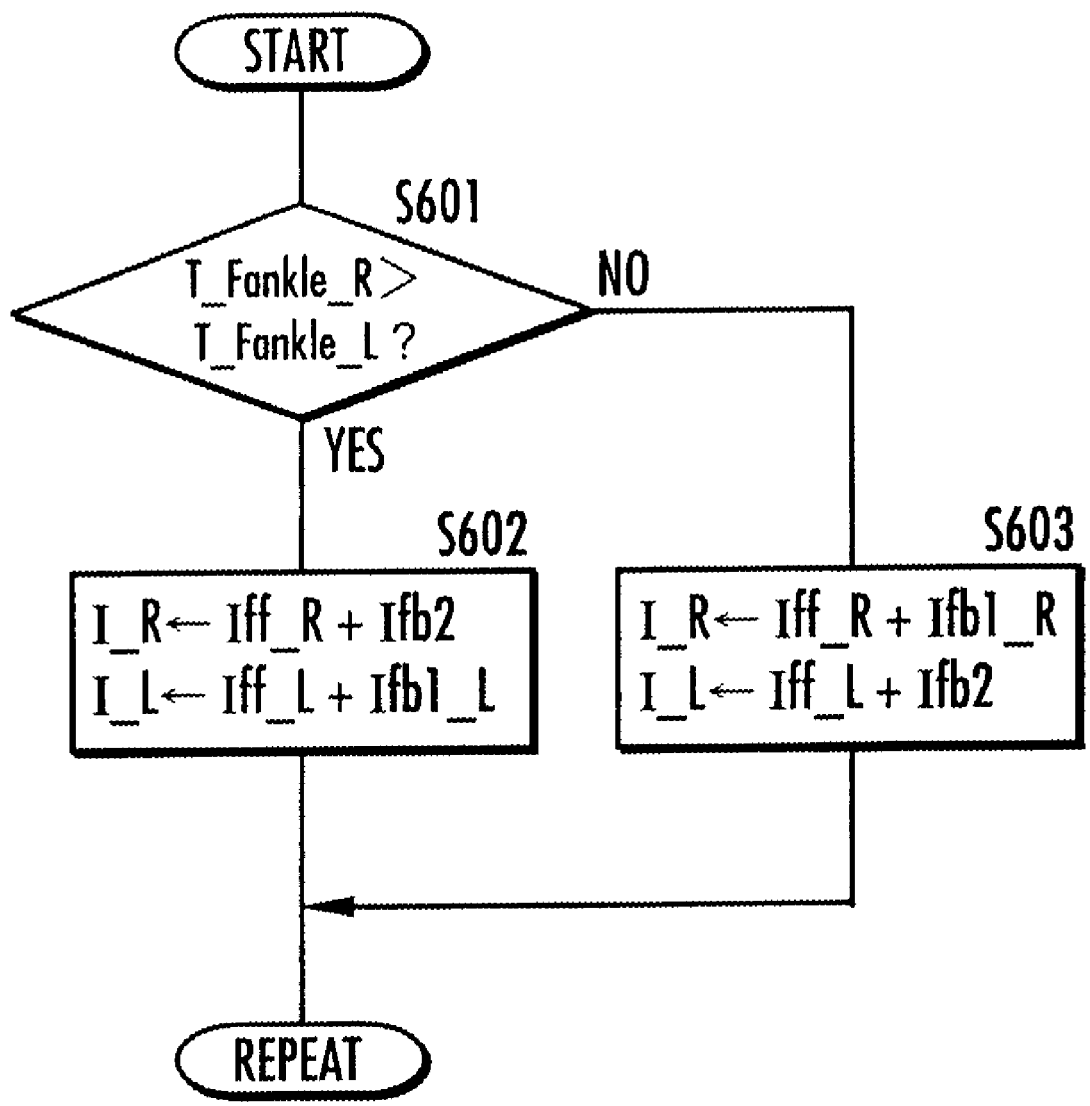
FIG. 16 is a flowchart illustrating the processing of an output control input determining means 64d shown in FIG. 13.
Figure 17:
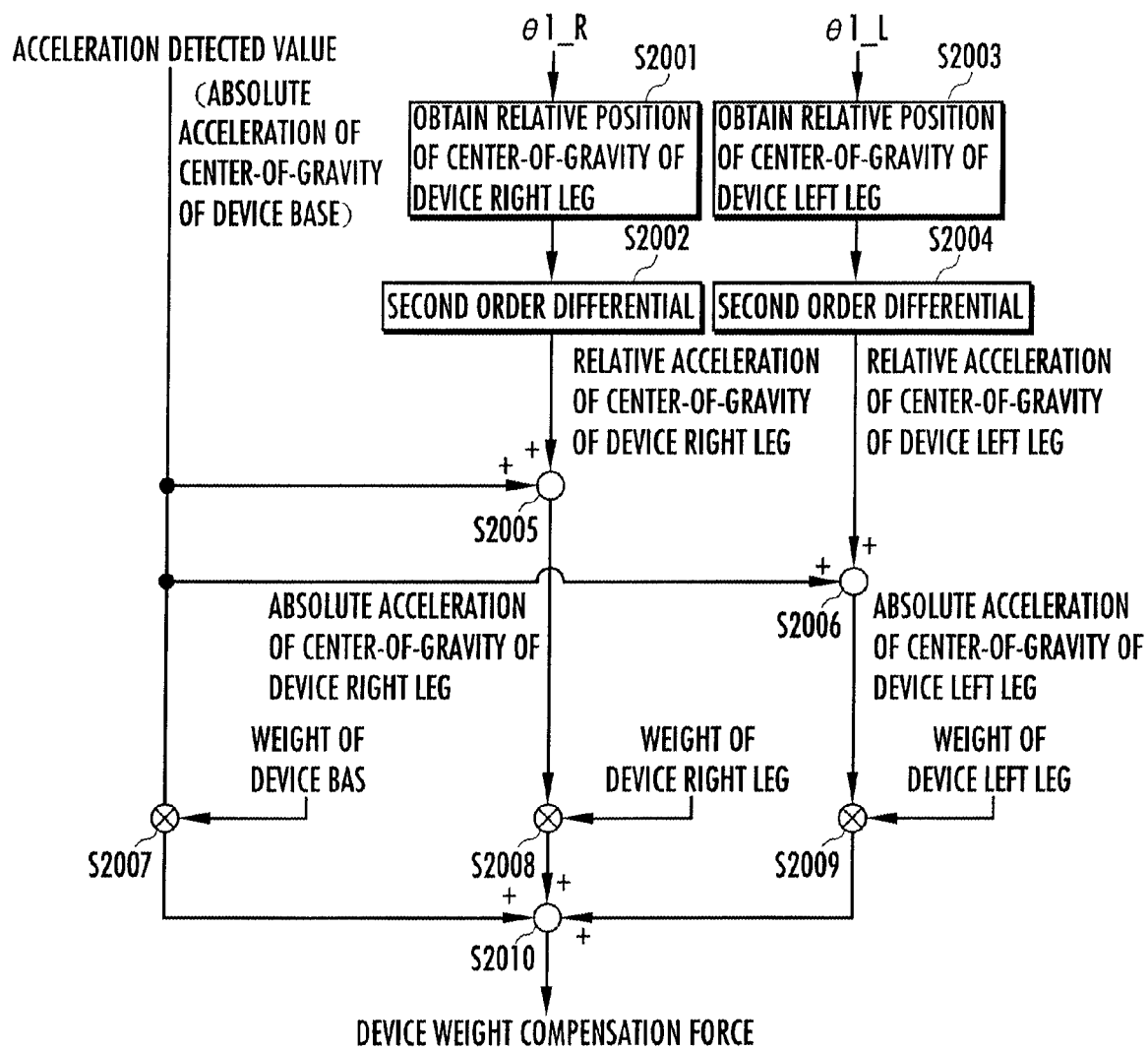
FIG. 17 is a block diagram illustrating a processing flow of S304 in FIG. 10 in a second embodiment of the present invention.

The invention claimed is:

1. A control device for a walking assistance device, comprising:

a seating section adapted to receive a part of a weight of a user seated on the seating section;

a pair of left and right foot sole installation sections adapted to be fitted to the foot soles of the legs of the user and land on the ground when the legs of the user are standing;

a pair of left and right leg links each having a plurality of joints and connecting the seating section and the foot sole installation sections, respectively;

an actuator for the right leg link and an actuator for the left leg link each of which drives at least one joint of each leg link;

an acting force detection element configured to detect a vertical acting force acting on the user from the seating section;

an actuator controller configured to control a driving force of at least one of the actuator for the right leg link and the actuator for the left leg link according to at least the detected vertical acting force so that the vertical acting force is maintained at a level of a predetermined lower limit or greater;

a target acting force setting element configured to limit a target acting force that is a target value of the vertical acting force to a value equal to or greater than the predetermined lower limit, and to set the target acting force to the value; and a treading force measuring element configured to measure a treading force of each of the legs of the user on the basis of an output of a first force sensor provided in each of the foot sole installation sections, wherein the actuator controller is configured to perform a feedback control for the driving force of at least one of the actuator for the right leg link and the actuator for the left leg link according to a difference between the target acting force and the detected acting force, so that the detected acting force is approximated to the target acting force, and the target acting force setting element is configured to set the target acting force according to a total sum of the measured treading forces of the legs of the user while limiting the target acting force to the lower limit or greater.

2. The control device for the walking assistance device according to claim 1, wherein the target acting force setting element is configured to set the target acting force to the lower limit at least in a case where the total sum of the treading forces is a predetermined value or smaller, and to set the target acting force to a value greater than the lower limit in a case where the total sum of the treading forces is greater than the predetermined value.

3. The control device for the walking assistance device according to claim 1, wherein the target acting force setting element is capable of selectively changing how to set the target acting force to the total sum of the treading forces.

4. The control device for the walking assistance device according to claim 1, wherein the actuator controller is configured to control the driving forces of the actuators according to first control inputs of the actuators, which have been determined so that a ratio between a share of the right leg link and a share of the left leg link of the force actually acting on the user from the seating section agrees with a target ratio determined according to a ratio between the treading force of the right leg and the treading force of the left leg of the user measured by the treading force measuring element, and a second control input, which is a feedback control input determined according to a difference between the target acting force and the detected acting force for at least one of the actuators.

5. The control device for the walking assistance device according to claim 1, wherein, in the case where the measured treading force is different between the left and right legs of the user, the actuator which performs the feedback control according to the difference between the target acting force and the detected acting force includes at least the actuator for the leg link corresponding to the leg of the user whose measured treading force is greater than the other out of the actuator for the right leg link and the actuator for the left leg link.

6. The control device for the walking assistance device according to claim 1, further comprising:

a device weight compensation force estimating element configured to estimate the total sum of supporting forces acting on the leg links from the floor side as a device weight compensation force against a vertical inertial force actually generated in the walking assistance device by a motion of the walking assistance device and a gravity acting on the walking assistance device;

a target total raising force determining element configured to determine the total sum of the target acting force and the estimated device weight compensation force as a target total raising force; and a distribution element configured to distribute the target total raising force according to a ratio between the measured treading force of the left leg and the measured treading force of the right leg of the user to determine target shares, which are target values of the shares of the leg links in the target total raising force, wherein the actuator controller is configured to control the driving forces of the actuators according to the first control input of the actuator for the right leg link determined so that the supporting force actually acting on the right leg link from the floor side agrees with the target share corresponding to the right leg link, the first control input of the actuator for the left leg link determined so that the supporting force actually acting on the left leg link from the floor side agrees with the target share corresponding to the left leg link, and the second control input which is the feedback control input determined according to a difference between the target acting force and the detected acting force for at least one of the actuators.

7. The control device for the walking assistance device according to claim 6, further comprising a force-to-be-controlled measuring element configured to measure the supporting forces actually acting on the leg links from the floor side as forces to be controlled on the basis of an output from second force sensors provided in the leg links, wherein the actuator controller is configured to determine: a right feedforward control input for the actuator for the right leg link according to at least the target share of the right leg link; a right first feedback control input for the actuator for the right leg link according to a difference between the target share of the right leg link and the detected force to be controlled of the right leg link; a left feedforward control input for the actuator for the left leg link according to at least the target share of the left leg link; a left first feedback control input for the actuator for the left leg link according to a difference between the target share of the left leg link and the detected force to be controlled of the left leg link; and a second feedback control input for one of the actuators according to a difference between the target acting force and the detected acting force, and wherein the actuator controller is configured to control the driving force of the actuator for the right leg link according to a control input, which is obtained by correcting the first control input by the second control input, with the right feedforward control input and the second feedback control input as the first control input of the actuator for the right leg link and the second control input, respectively, and controls the driving force of the actuator for the left leg link according to the first control input with a control input, which is obtained by correcting the left feedforward control input by the left first feedback control input, as the first control input of the actuator for the left leg link, in the case where the measured treading force of the right leg of the user is greater than the treading force of the left leg or in the case where the measured force to be controlled of the right leg link is greater than the force to be controlled of the left leg link, and controls the driving force of the actuator for the left leg link according to a control input, which is obtained by correcting the first control input by the second control input, with the left feedforward control input and the second feedback control input as the first control input of the actuator for the left leg link and the second control input, respectively, and controls the driving force of the actuator for the right leg link according to the first control input with a control input, which is obtained by correcting the right feedforward control input by the right first feedback control input, as the first control input of the actuator for the right leg link, in the case where the measured treading force of the left leg of the user is greater than the treading force of the right leg or in the case where the measured force to be controlled of the left leg link is greater than the force to be controlled of the right leg link.

\* \* \* \* \*